US012677941B2

(12) United States Patent
Dong

(10) Patent No.: US 12,677,941 B2
(45) Date of Patent: Jul. 14, 2026

(54) DEVICE FOR STORING LEGAL DOCUMENTS AND MATERIALS

(71) Applicant: Yichengze Dong, Shanghai (CN)

(72) Inventor: Yichengze Dong, Shanghai (CN)

( * ) Notice: Subject to any disclaimer, the term of this patent is extended or adjusted under 35 U.S.C. 154(b) by 222 days.

(21) Appl. No.: 18/640,489

(22) Filed: Apr. 19, 2024

(65) Prior Publication Data

US 2025/0325104 A1 Oct. 23, 2025

(51) Int. Cl.
*G07C 9/00* (2020.01)
*A47B 63/00* (2006.01)

(52) U.S. Cl.
CPC .......... *A47B 63/00* (2013.01); *G07C 9/00182* (2013.01); *A47B 2220/0091* (2013.01)

(58) Field of Classification Search
CPC ............ A47B 63/00; A47B 2220/0091; G07C 9/00182
See application file for complete search history.

(56) References Cited

U.S. PATENT DOCUMENTS 9,032,667 B2 * 5/2015 Artwohl .................. E05F 15/73 49/169
2021/0000275 A1 * 1/2021 Excoffier ............. G07G 1/0063

* cited by examiner

*Primary Examiner* — Jamara A Franklin
(74) *Attorney, Agent, or Firm* — Clement Cheng

(57) ABSTRACT

The invention discloses a device for storing legal documents and materials, relates to the technical field of the storage device, comprises a cabinet body, a plurality of cabinet doors, a controller and a plurality of support plates, one side of cabinet body is provided with controller, one end of the cabinet door is hinged with cabinet body, and the other end of cabinet door is connected to the cabinet body by an electronic lock, and the electronic lock is connected to controller; an image sensor is arranged along the orthogonal direction on the electronic lock, the image sensor is connected to the controller, the image sensor is used for collecting file cover image for the document to be entered into cabinet, and controller controls the unlocking or locking of electronic lock according to file cover image.

17 Claims, 21 Drawing Sheets

DEVICE FOR STORING LEGAL DOCUMENTS AND MATERIALS

BACKGROUND OF THE INVENTION

Field of the Invention

The present invention relates to the technical field of storage device, in particular to a device for storing legal documents and materials.

Description of the Related Art

Legal documents are documents used by judicial administrative organs, parties, lawyers, etc. in resolving litigation and non-litigation cases, as well as non-normative documents of judicial organs. In general, legal documents include civil litigation, marriage and family, company, labor, criminal litigation, administrative and economic documents.

In the prior art, there are already relevant technical solutions designed for the storage scenario of legal documents.

For example, the Chinese patent No. CN202011214512.X discloses an anti-theft cabinet for legal documents. The upper file box that stores important legal documents is installed and hidden in the top inner side of the cabinet body by short pins and long pins, and only by screwing all long pins to the end and keeping all short pins unchanged can the upper file box slide down and be exposed, so that the important legal documents stored in the upper file box are not easy to be stolen; the lower file box that stores important legal documents is located at the lower end of the document frame, and only when the middle three camshafts are rotated 90 degrees, the top end of the middle three cams detaches from the upper end face of the T-shaped block and press against the side of the upper rectangular groove, the file frame can move up and get out of the partition, thereby the lower file box is exposed, so that the important legal documents stored in the lower file box are not easy to be stolen. When the position of the file cabinet needs to be adjusted, the universal wheel is made to descend synchronously with the lifting plate by rotating the handle, and the universal wheel is exposed from the lower end of the cabinet body to contact with the ground, so that the position of the file cabinet can be easily moved.

For another example, Chinese patent No. CN201710431611.5 discloses a legal document access system, comprising a server, a field terminal and a file cabinet; the file cabinet is divided into a plurality of independent file boxes, the folder containing legal documents is placed in the file box, the folder is provided with an electronic tag, and a reader for reading the electronic tag information is also installed in the file box; the server comprises a first processor, a first wireless transmitting module, an input module, memory and the first wireless receiving module; the file box is also provided with the third processor, the third wireless receiving module and the third wireless transmitting module; the field terminal comprises the second processor, the second wireless receiving module, the input module, the display module and the second wireless transmitting module. The legal document access system, after being used by the user, the legal document only needs to be placed in any file box, which greatly facilitates the user and can also ensure the normal operation of the access system.

However, in the actual implementation, the inventor found that in this kind of technical scheme, the main focus is on the storage process of documents, such as making the documents convenient for storage and the file cabinet convenient for moving through the design of a specific mechanical structure, and no specific design is made for the specific classification and storage of documents, for example, only focusing on the record of the file number in the process of putting the file into the cabinet, and does not involve the control process of the classified storage of the documents. This kind of design is easy to cause confusion in file classification and inconvenience for the search in the actual use process.

SUMMARY OF THE INVENTION

In order to solve the above technical issues, the invention provides a device for storing legal documents and materials.

The technical solution is as follows:

A device for storing legal documents and materials, comprising a cabinet body, a plurality of cabinet doors, a controller and a plurality of support plates, an inner of the cabinet body is provided with the plurality of support plates, a storage cavity is formed between two adjacent support plates, one end of the cabinet body is provided with the plurality of cabinet doors, each of the plurality of cabinet doors is opposite to one of the storage cavities respectively, one side of the cabinet body is provided with the controller;

- one end of the cabinet door is hinged with the cabinet body, the other end of the cabinet door is connected to the cabinet body through an electronic lock, and the electronic lock is connected to the controller,
- an image sensor is arranged along the orthogonal direction on the electronic lock, the image sensor is connected to the controller, the image sensor is used for collecting a file cover image of the documents to be entered into the cabinet, and the controller controls unlocking or locking of the electronic lock according to the file cover image.

On the other hand, the controller comprises:

- a first image processing module, receiving the file cover image and extracting the file cover image to obtain a character recognition result;
- the character recognition result comprises a plurality of character slice images corresponding to the front character of the documents to be entered into the cabinet;
- a character statistics module, connected to the first image processing module, the character statistics module classifies and does statistics to the character slice images sequentially, and judges a category to which the documents to be entered into the cabinet belong according to a statistical result;
- an unlocking module, connected to the character statistics module, the unlocking module judges the documents to be entered into the cabinet according to the category and a predetermined cabinet classification, and controls the electronic lock, so that the documents to be entered into the cabinet conform to the cabinet classification.

On the other hand, the first image processing module comprises:

- a grayscale module, converting the file cover image into the grayscale image;
- an edge detection module, connected to the grayscale module, and the edge detection module extracts a plurality of edge regions from the grayscale image;
- the plurality of edge regions comprise a word segmentation region composed of a plurality of characters;
- a connected domain analysis module, connected to the edge detection module, and the connected domain analysis module classifies the area and graphic shape of the edge areas to extract a text area;

a slice output module, connected to the connected domain analysis module, and the slice output module generates a character slice image according to the text area, and outputs the character slice image.

On the other hand, the character statistics module comprises:

a word segmentation module, performing word segmentation processing on the character slice image to extract to obtain the word information and assemble to obtain the text sequence;

a part-of-speech annotation module, connected to the word segmentation module, and the part-of-speech annotation module performs part-of-speech annotation on a plurality of word information in the text sequence to obtain an annotation sequence;

a sequence classification module, connected to the part-of-speech annotation module, and the sequence classification module classifies the annotation sequence to obtain the category to which the annotation sequence belongs;

a comprehensive statistical module, connected to the sequence classification module, and the comprehensive statistical module obtains the category to which the documents to be entered into the cabinet belong according to the category to which the annotation sequence belongs.

On the other hand, the controller further comprises:

a barcode recognition module, identifying and obtaining a file coding information from the character slice image;

a database inquiry module, connected to an external file management database and the barcode recognition module, and the database inquiry module searches the file management database according to the file coding information, to generate a search information;

the search information comprises historical storage cabinet information of the documents to be entered into the cabinet;

a cabinet body judgment module, connected to the database inquiry module, the cabinet body judgment module judges whether the documents to be entered into the cabinet is taken out from the current cabinet body, according to the search information, and generates a cabinet body judgment result;

an electronic lock control module, connected to the cabinet body judgment module, and the electronic lock control module controls unlocking and locking of the electronic lock according to the cabinet body judgment result.

On the other hand, the controller further comprises:

a registration module, connected to the database inquiry module and the file management database, and when the search information indicates that the historical storage cabinet information is not presented in the file management database, the registration module registers the documents to be entered into the cabinet in the file management database according to the file coding information.

On the other hand, the other end of the cabinet body is detachably provided with the plurality of drying and mildew prevention mechanisms, a gap is formed between the support plate and an inner wall of the other end of the cabinet body;

each of the plurality of drying and mildew prevention mechanisms comprises:

an accommodation box, the other end of the cabinet body is provided with a mounting hole, the accommodation box is arranged in the mounting hole, the accommodation box, which is positioned at one side of the cabinet body, is provided with a plurality of through holes, a plurality of drying pills is filled in the accommodation box;

two connecting plates, provided at two ends of accommodation box, the connecting plates are detachably connected to the cabinet body.

On the other hand, the device further comprises humidity sensors, one of the humidity sensors is arranged in each of the storage cavities respectively, the humidity sensors are arranged on the inner wall of the cabinet body, and the humidity sensors are connected to the controller.

On the other hand, a ventilation device is installed on a back of the cabinet body, and the ventilation device is connected between the inner and the exterior of the cabinet body respectively;

the ventilation device is connected to and controlled by the controller;

the controller controls the opening of the ventilation device according to humidity data output by the humidity sensors and a pre-configured humidity threshold, so as to ventilate the inner of the cabinet body.

On the other hand, the controller further comprises a signal filtering module, and the signal filtering module is used for filtering the humidity data output by the humidity sensors;

the signal filtering module comprises:

a signal sampling module, intercepting the input humidity data according to a preconfigured receiving window, and sampling the humidity data according to a preset sampling rate, to obtain a window sampling data;

a sequencing module, connected to the signal sampling module, and the sequencing module compares a plurality of data points in the window sampling data to obtain a median value of the plurality of data points;

an assignment module, connected to the sequencing module, and the assignment module outputs the median value as an actual humidity data.

On the other hand, the device further comprises lighting lamps, an upper side of each of the storage cavities is provided with one of the lighting lamps respectively, and the lighting lamps are connected to the controller.

On the other hand, the device further comprises a warning light and a voice prompter, each of the cabinet doors is provided with a warning light respectively, an upper end of the cabinet body is provided with a voice prompter, and the warning light and the voice prompter are connected to the controller respectively.

On the other hand, the cabinet body comprises a main cabinet body and at least one auxiliary cabinet body that is detachably arranged on the other side of the main cabinet body.

On the other hand, the device further comprises file clamping mechanisms, and an upper end of each of the support plates is provided with one of the file clamping mechanisms respectively.

On the other hand, each of the file clamping mechanisms comprises a first clamp plate, a second clamp plate, a first clamping block and a second clamping block;

the first clamp plates and the second clamp plates are all arranged on the support plates, a plurality of the second clamp plates are arranged between the two of the first clamp plates, one side of each of the first clamp plates, which is close to one of the second clamp plates, is provided with one of the first clamping blocks, two sides of each of the second clamp plates are provided with one of the second clamping blocks, the two second clamping blocks on each of the second clamp plates are staggered with each other, and the two second clamping blocks, on one side of the two adjacent second clamp plates which are closed to each other, are opposite to each other.

On the other hand, the device further comprises a plurality of springs, mounting grooves are formed in the first clamp plates and the second clamp plates, the plurality of springs are arranged in the mounting grooves, the first clamping blocks and the second clamping blocks are arranged in the corresponding mounting grooves, and the first clamping blocks and the second clamping blocks are connected to the corresponding springs respectively.

On the other hand, the device further comprises a first limiting plate and a second limiting plate, two sides of a notch of each of the mounting grooves is provided with one of the first limiting plates, two sides of the first clamping blocks and the second clamping blocks are provided with one of the second limiting plates, the first limiting plates are matched with the second limiting plates, so as to limit the first clamping blocks and the second clamping blocks in the mounting grooves.

On the other hand, micro switches are further arranged in the mounting grooves, and a triggering part of the micro switches resists against the internal bottom surface of the first clamping blocks or the second clamping blocks;

the micro switches are connected to the controller, and output a micro switch trigger signal to the controller when the trigger part is pressed;

the micro switch trigger signal comprises a number corresponding to one of the micro switches;

the controller determines document placement position according to the micro switch trigger signal.

The above technical solution has the benefits as follows:

Aiming at the problem that the legal document storage cabinet in the prior art is insufficient for the classification management of documents, it is improved in the scheme, a plurality of storage cavities and matching cabinet doors are arranged on the cabinet body, each storage cavity corresponds to a category of legal documents respectively, and an electronic lock with an image sensor is configured on the cabinet door. When the user needs to store the legal document in the storage cavity, the controller judges whether the document should be stored in the storage cavity according to the file cover image collected by the image sensor, and then controls the electronic lock to unlock or lock, so as to avoid the problem of file misplacement and category confusion.

In the Figs: 1. Cabinet body; 101. Main cabinet body; 102 Auxiliary cabinet body; 103. Connecting sheet; 2. Drying and mildew prevention mechanism; 201. Accommodation box; 202. Connecting plate; 203. Through hole; 3. Cabinet door; 4. Controller; 5. Support plate; 6. Mounting hole; 7. Humidity sensor; 8. Lighting lamp; 9. Warning light; 10. Voice prompter; 11. File clamping mechanism; 111. First clamp plate; 112. Second clamp plate; 113. First clamping block; 114. Second clamping block; 115. Spring; 116. Mounting groove; 117. First limiting plate; 118. Second limiting plate.

DETAILED DESCRIPTION

The technical solutions in the embodiments of the present invention will be clearly and completely described below in conjunction with the accompanying drawings in the embodiments of the present invention, and it is clear that the described embodiments are only some embodiments of the present invention, not all embodiments. Based on the embodiments in the present invention, all other embodiments obtained by a person skilled in the art without creative labor fall within the scope of protection of the present invention.

In the description of the present invention, it should be noted that if the terms “center”, “up”, “down”, “left”, “right”, “vertical”, “horizontal”, “inner”, “outer”, etc., appear, the orientation or positional relationship indicated by it is based on the orientation or positional relationship shown in the accompanying drawing, and is only for the convenience of describing the invention and simplifying the description, and does not indicate or imply that the device or element referred to must have a specific orientation, be constructed and operated in a specific orientation, and therefore cannot be understood as a limitation of the present invention. In addition, the terms "first", "second", "third" are used for descriptive purposes only and should not be construed as indicating or implying relative importance.

In the description of the present invention, it should be noted that, unless otherwise expressly specified and limited, the terms "mounted", "connected" and "coupled" should be understood broadly, for example, they may be fixedly connected, detachable, or integrally connected, mechanically connected, electrically connected, directly connected, or indirectly connected through an intermediate medium, and may be connected internally between two elements. For those skilled in the art, the specific meaning of the above terms in the present invention can be understood on a case-by-case basis.

Figure 1:
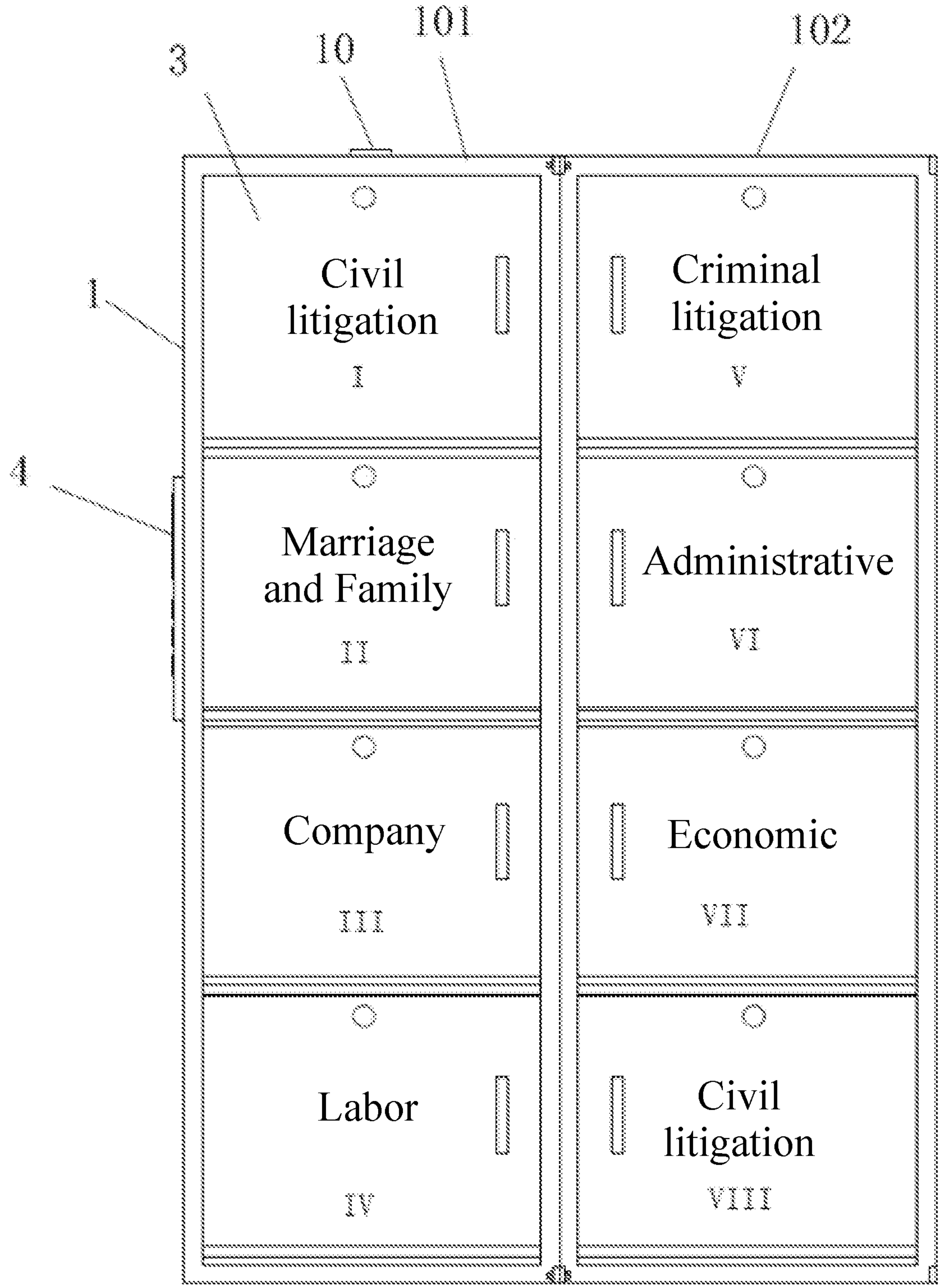
FIG. 1 is a front view of the device for storing legal documents and materials in the present invention.
Figure 2:
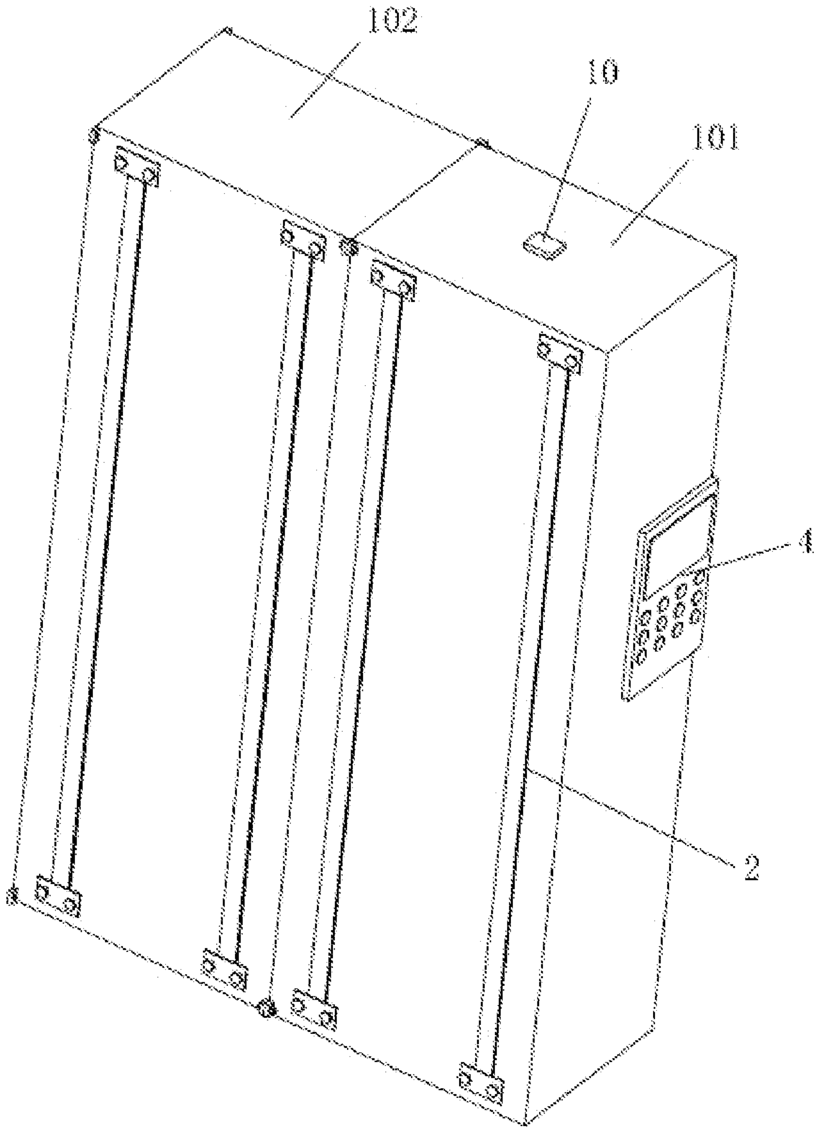
FIG. 2 is a schematic diagram I of the back structure of the device for storing legal documents and materials in the present invention.
Figure 3:
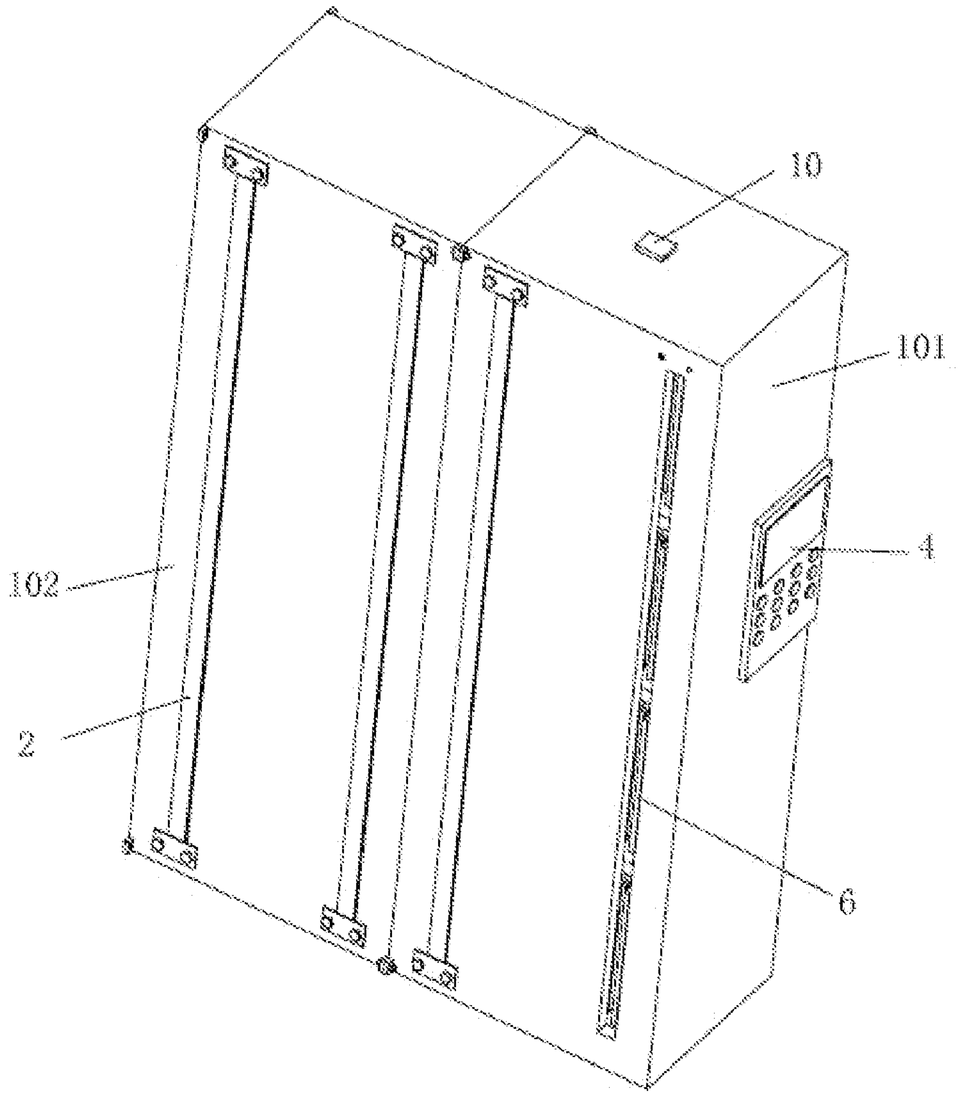
FIG. 3 is a schematic diagram II of the back structure of the device for storing legal documents and materials in the present invention.
Figure 4:
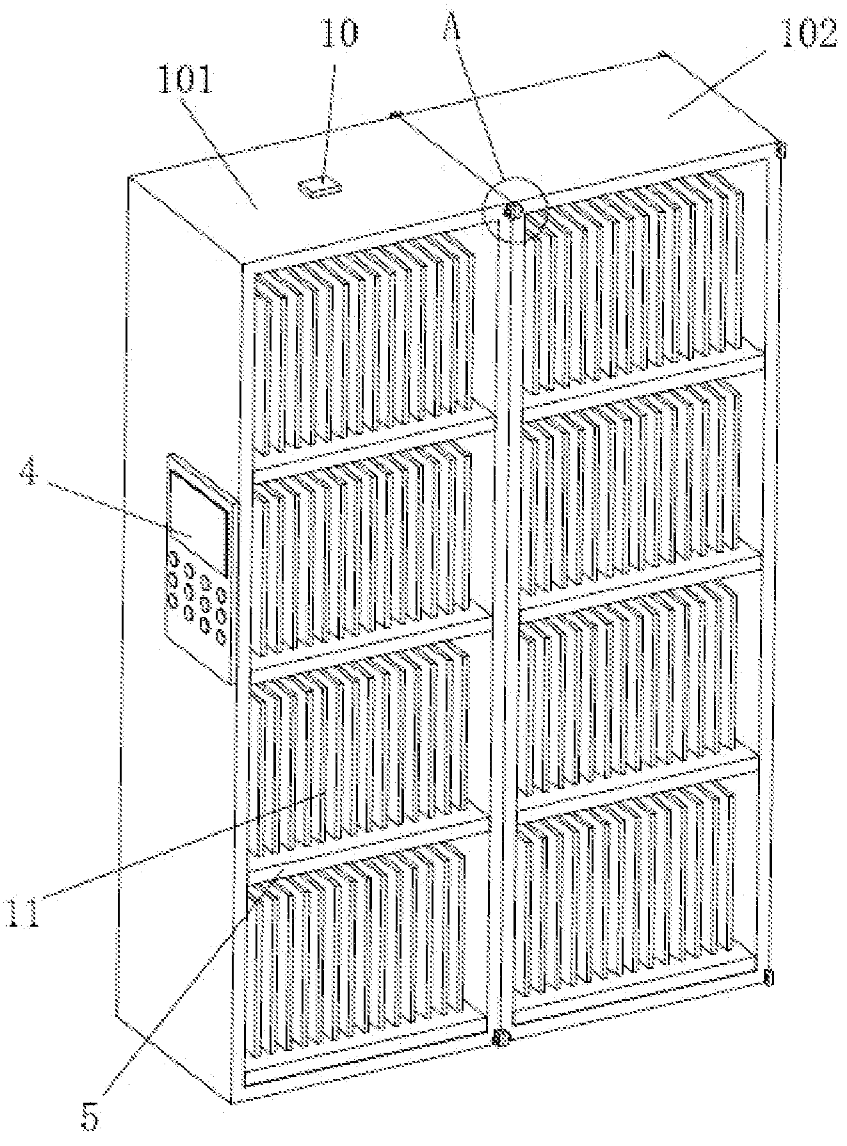
FIG. 4 is a schematic diagram of the internal structure of the device for storing legal documents and materials in the present invention.
Figure 5:
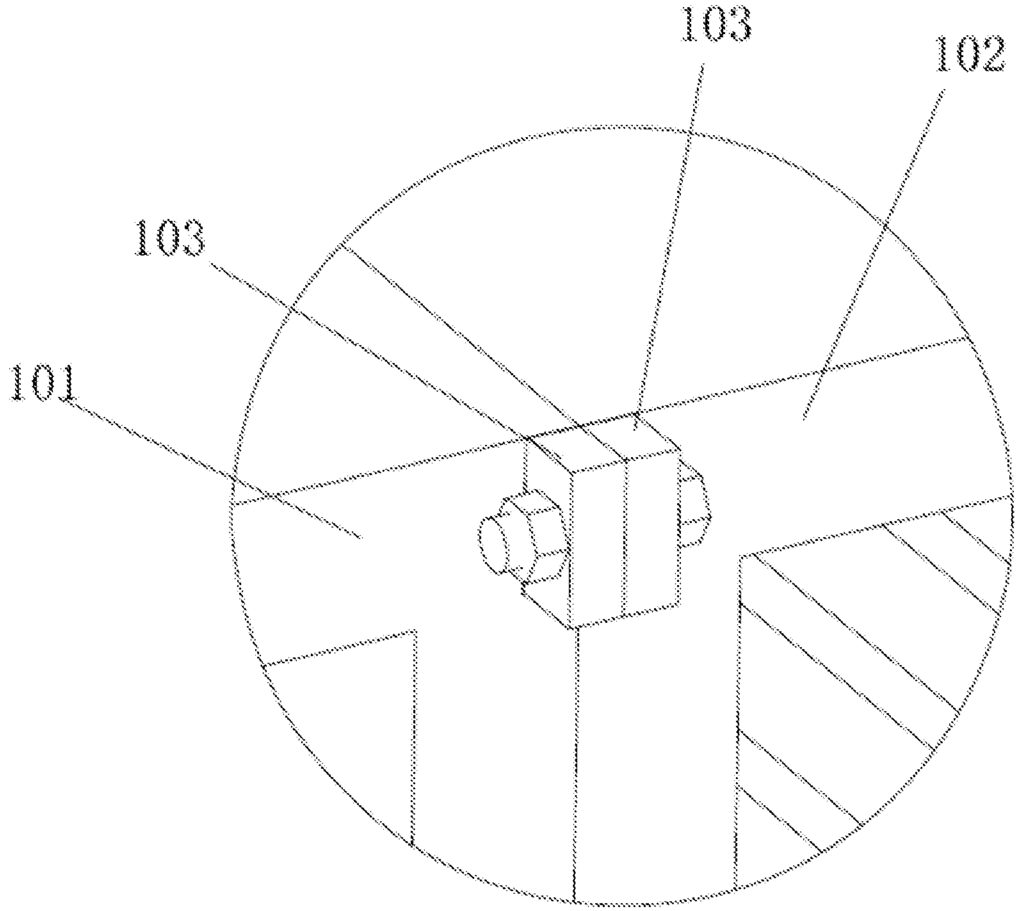
FIG. 5 is an enlarged view of A in FIG. 4.
Figure 6:
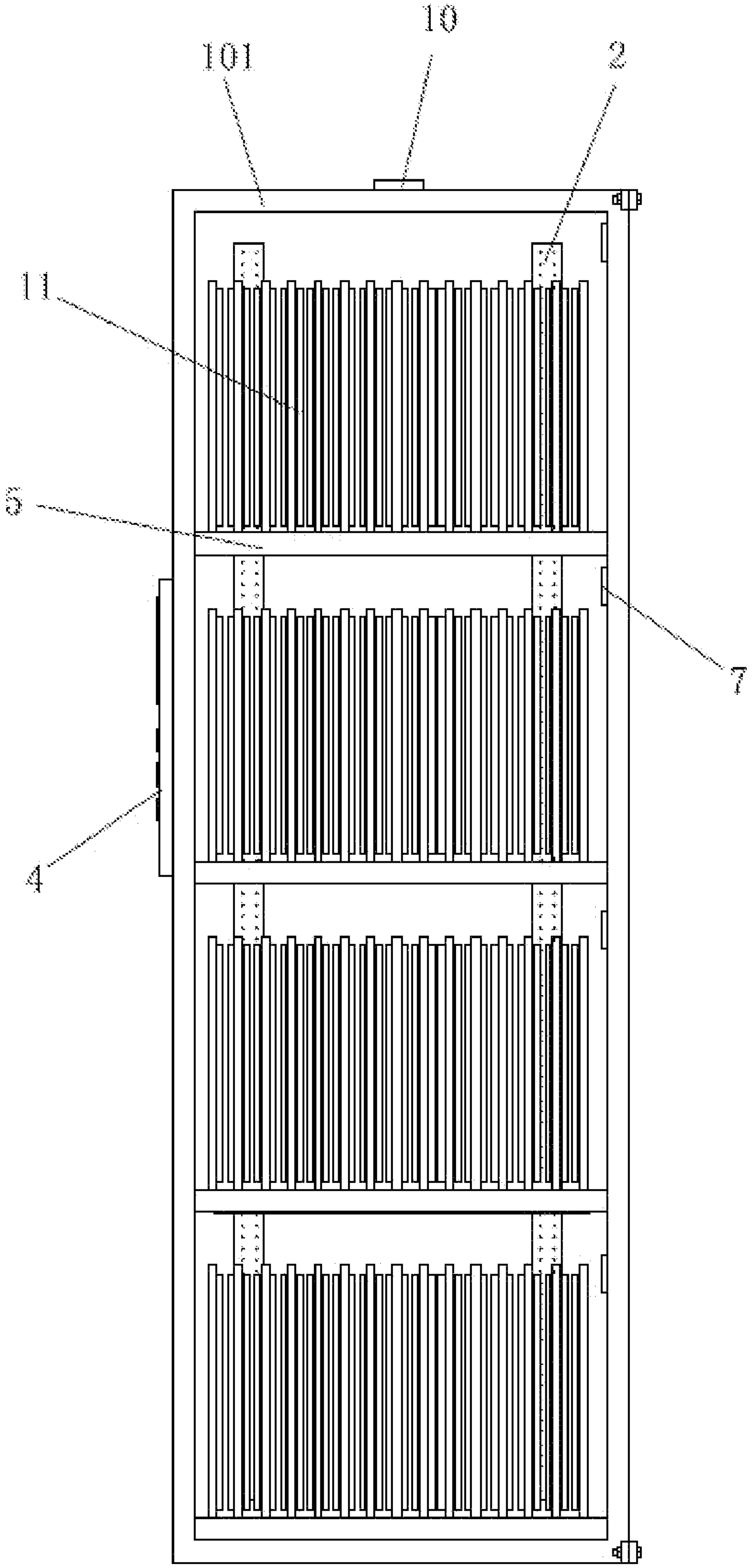
FIG. 6 is a schematic diagram I of the internal structure of the main cabinet body in the present invention.
Figure 7:
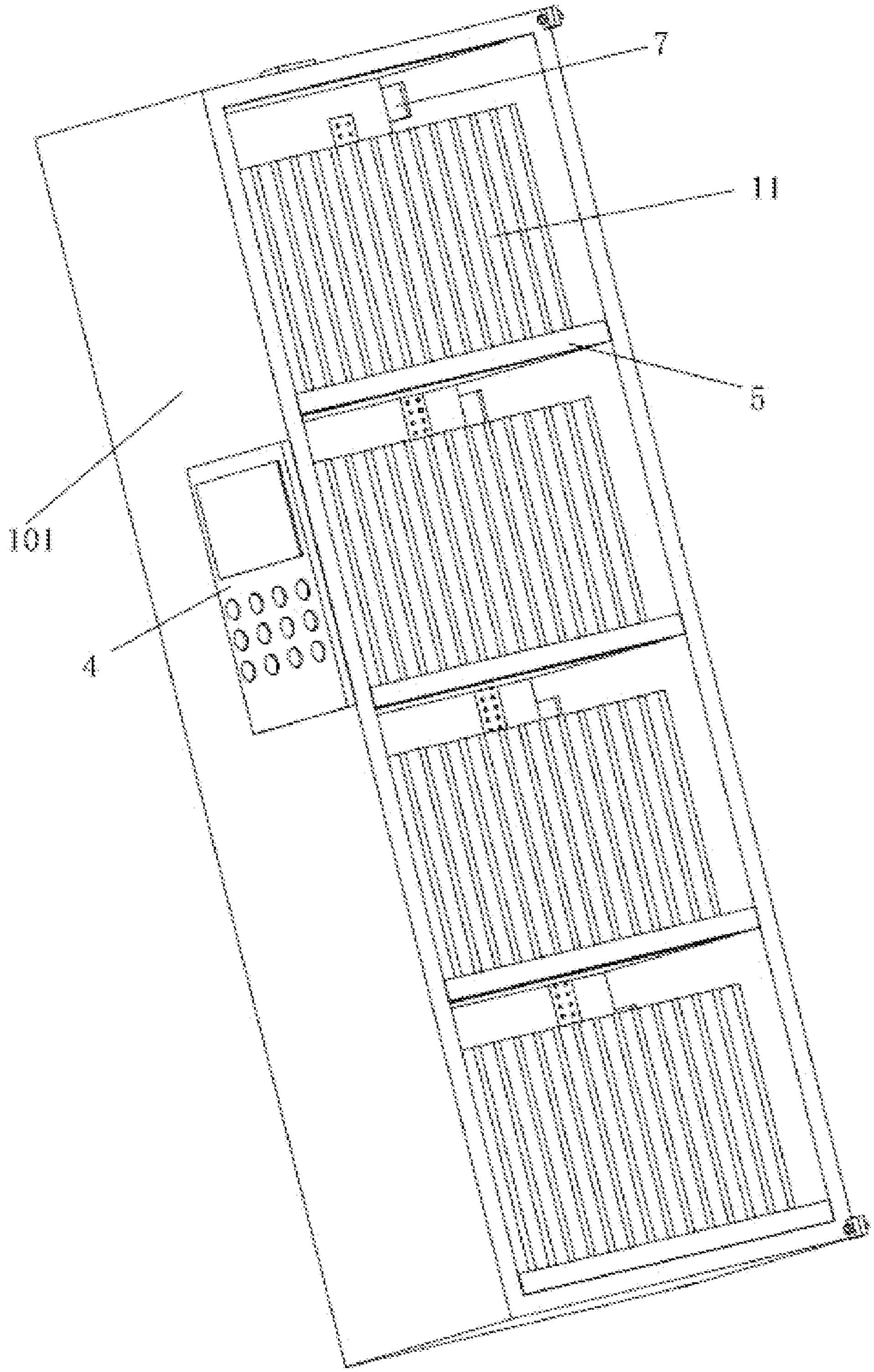
FIG. 7 is a schematic diagram II of the internal structure of the main cabinet body in the present invention.

Referring to FIGS. 1-14, there is shown a preferred embodiment, a device for storing legal documents and materials, comprising a cabinet body 1, a plurality of drying and mildew prevention mechanisms 2, a plurality of cabinet doors 3, a controller 4 and a plurality of support plates 5, an inner of the cabinet body 1 is provided with the plurality of support plates 5, a storage cavity is formed between two adjacent support plates 5, one end of the cabinet body 1 is provided with the plurality of cabinet doors 3, each of the plurality of cabinet doors 3 is opposite to one of the storage cavities respectively, the other end of the cabinet body 1 is detachably provided with the plurality of drying and mildew prevention mechanisms 2, a gap is formed between the support plate 5 and an inner wall of the other end of the cabinet body 1, so that the plurality of storage cavities communicate to each other. Of course, the support plate 5 can directly contact the inner wall of the other end of the cabinet body 1, so that the plurality of storage cavities do not communicate to each other. One side of the cabinet body 1 is provided with the controller 4. In the embodiment, referring to FIG. 1, the cabinet body 1 comprises a main cabinet body 101 and at least one auxiliary cabinet body 102 that is detachably arranged on the other side of the main cabinet body 101. Wherein, the number of the auxiliary cabinet body 102 can be one or more, so as to increase the volume of the cabinet body 1, and to facilitate to disassemble and move the cabinet body 1. The two adjacent auxiliary cabinet bodies 102 are detachably connected with each other, and the main cabinet body 101 and the auxiliary cabinet body 102 are detachably connected with each other, see FIG. 5. A connecting sheet 103 is arranged on the auxiliary cabinet body 102 and the main cabinet body 101, the two connecting sheets 103 are connected by bolt, so that the plurality of auxiliary cabinet bodies 102 are connected and fixed, the auxiliary cabinet body 102 and the main cabinet body 101 are connected and fixed. The controller 4 is a PLC controller, the controller 4 is arranged on the main cabinet body 101. While the drying and mildew prevention mechanism 2 is arranged on the main cabinet body 101 and the auxiliary cabinet body 102, and is used for drying the inter of the cabinet body 1. The structure of the main cabinet body 101 and the structure of the auxiliary cabinet body 102 is same, and the shape of the main cabinet body 101 and the shape of the auxiliary cabinet body 102 is also same. Referring to FIG. 4, a storage cavity is also formed between the support plates 5 on the top side and the inner wall of the upper side of the cabinet body 1.

Each of the plurality of drying and mildew prevention mechanisms 2 comprises:

an accommodation box 201, the other end of the cabinet body 1 is provided with a mounting hole 6, the accommodation box 201 is arranged in the mounting hole 6, the accommodation box 201, which is positioned at one side of the cabinet body 1, is provided with a plurality of through holes 203, a plurality of drying pills is filled in the accommodation box 201. The plurality of drying pills are used for absorbing the water vapor in the air, so as to make the cabinet body dry.

Two connecting plates 202, provided at two ends of accommodation box 201, the connecting plates 202 are detachably connected to the cabinet body 1. See FIG. 9 and FIG. 10, the plurality of drying pills are arranged in the accommodation box 201, so as to absorb the water vapor in the cabinet body 1, so as to keep the inner of the cabinet body 1 dry, and the dampness, wrinkles or mildew of the documents caused by the dampness in the cabinet body 1 can be avoided. The connecting plates 202 are fixed and connected to the two ends of the accommodation box 201, and the connecting plates 202 connects to the cabinet body 1 via the bolt, so as to facilitate to disassemble the accommodation box 201. One side of the accommodation box 201, which is far away from the inner of the cabinet body 1, is provided with a sealing cover, the sealing cover is detachably connected to the accommodation box 201, so as to facilitate to replace the drying pills. In the embodiment, a drying and mildew prevention mechanism 2 is formed by combining an accommodation box 201, a sealing cover, a connecting plate 202 and drying pills, which is convenient for installation or disassembly, and can be realized to dry inside the cabinet body 1.

Furthermore, as a preferred embodiment, the device comprises an electronic lock, one end of the cabinet door 3 is hinged with the cabinet body 1, specifically the inner wall of the cabinet body 1. When the cabinet door 3 is closed, the hinge can be obscured. The other end of the cabinet door 3 is connected to the cabinet body 1 through the electronic lock, and the electronic lock is connected to the controller 4. In the embodiment, referring to FIG. 1, each of the cabinet doors 3 is provided with words, which are used for classifying the storage cavity to which each document belongs, and each of the cabinet doors 3 corresponds to a number, and a plurality of electronic locks are connected to a controller 4, electronic locks can be controlled to open automatically through controller 4. When the cabinet door 3 is closed, electronic lock can automatically lock the cabinet door 3. Each of the electronic locks can be independently controlled by the controller 4, and the specified cabinet door 3 can be opened by controller 4 inputting corresponding number. In this embodiment, the specified cabinet door 3 can be opened through the controller 4, so that the cabinet door 3 can be opened separately, so that the storage cavity to which the specified document belongs can be opened. The electronic lock is installed on the cabinet door 3 and the cabinet body 1, and the structure of the electronic lock is the existing structure, and it is no longer limited here.

In the embodiment, by being provided with the words and numbers of the document type on each cabinet door 3, the storage cavity can be classified, and the document is convenient for classification and arrangement.

Specifically, in order to achieve a better effect of document classification and arrangement, image recognition technology can be used to control the electronic lock in combination with the controller, so as to avoid the misplacement of documents.

Figure 15:
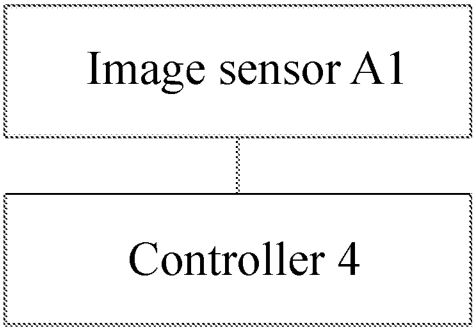
FIG. 15 is a schematic diagram of an image sensor in the present invention.

In the embodiment, an image sensor A1 is arranged along the orthogonal direction on the electronic lock, as seen in FIG. 15, the image sensor A1 is connected to the controller 4, the image sensor A1 is used for collecting a file cover image of the documents to be entered into the cabinet, and the controller 4 controls unlocking or locking of the electronic lock according to the file cover image.

Specifically, an electronic lock is respectively arranged on each of the cabinet doors 3, and the electronic lock comprises a part fixed on the cabinet door 3 and a part on the cabinet body 1. The part on the cabinet door 3 is provided with an image sensor facing the front, and when the document to be entered into the cabinet is close to the cabinet and the switch on the electronic lock is triggered, it can collect at least one file cover image, so that the controller 4 recognizes the file cover image according to a preconfigured computer program, so as to judge whether document to be entered into the cabinet belongs to the document type of the current cabinet body, and to control the opening and closing of the electronic lock, and avoids the risk of misplace.

Figure 16:
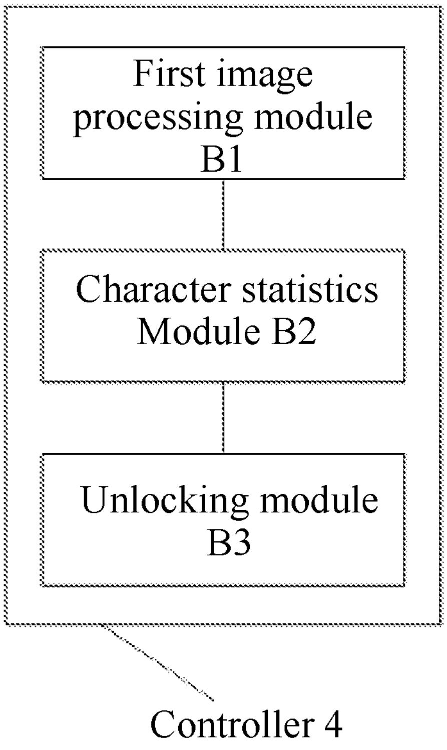
FIG. 16 is a schematic diagram of the software module of the controller in the present invention.

In the embodiment, as seen in FIG. 16, the controller 4 comprises:

- a first image processing module B1, receiving the file cover image and extracting the front image information of the documents to obtain a character recognition result;
- the character recognition result comprises a plurality of character slice images corresponding to the front character of the documents to be entered into the cabinet;
- a character statistics module B2, connected to the first image processing module B1, the character statistics module B2 classifies and does statistics to the character slice images sequentially, and judges a category to which the documents to be entered into the cabinet belong according to a statistical result;
- an unlocking module B3, connected to the character statistics module B2, the unlocking module B3 judges the documents to be entered into the cabinet according to the category and a predetermined cabinet classification, and controls the electronic lock, so that the documents to be entered into the cabinet conform to the cabinet classification.

Specifically, in order to achieve a more accurate recognition effect and a faster unlocking efficiency, in this embodiment, a plurality of modules are constructed in the controller 4 to realize this process. Specifically, the first image processing module B1, the character statistics module B2 and the unlocking module B3 all belong to software modules that are compiled by corresponding computer instructions and are used for realizing corresponding functions. A pre-trained artificial intelligence model is arranged in the first image processing module B1, and the artificial intelligence model can extract the front image information of the document after receiving the file cover image, including feature extraction, image segmentation, classification to obtain a character recognition result, and the character recognition result is essentially a plurality of groups of local images, corresponding to the area of the presence of character recognized by the artificial intelligence model. For example, the AI model can use the U-net model to extract the area containing text features in the image, and further segment the corresponding area, and can also be replaced with other models according to actual requirements. Depending on the type of document to be entered into the cabinet, the characters contained on the front may have different font sizes, so the recognized local images may include single word, words, short sentences or paragraphs, etc., and there are certain differences in their sizes. Subsequently, the character slice image is sent to the character statistics module B2 for doing statistics. In the character statistics module B2, by using the pre-trained natural language processing models, such as long short-term memory network models (LSTMs), the text of a certain sequence length, including words, short sentences, paragraphs, etc., can be semantic recognized by a pre-trained model, and the semantic results can be classified according to the preconfigured text category, which corresponds to the text type marked on the cabinet body. By statistically carrying out the classification results of all character slice images, thereby determining the category to which the document to be entered into the cabinet belongs. The unlocking module B3 generate the corresponding enable signal to control the electronic lock to unlock when the category and the cabinet body classification match, and if they do not match, the corresponding prompt signal is generated, so as to avoid the problem that the document is misplaced.

Figure 17:
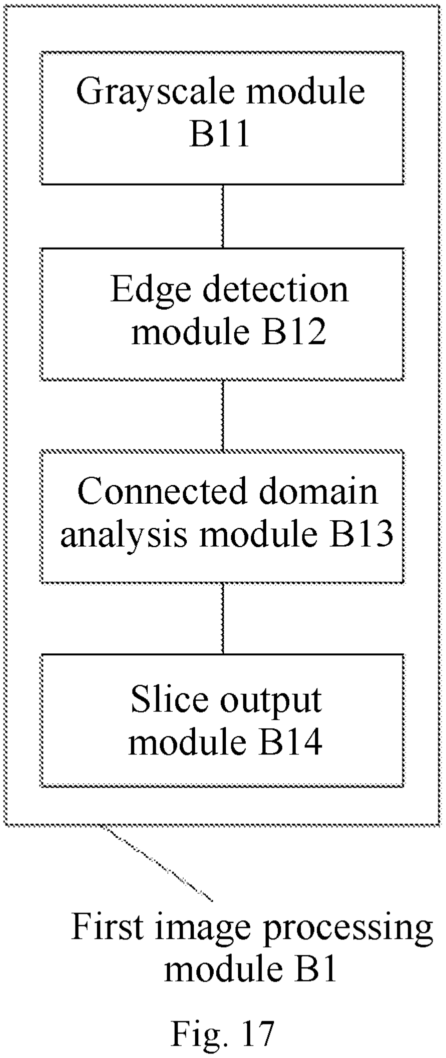
FIG. 17 is a schematic diagram of the first image processing module in the present invention.

In the embodiment, as seen from FIG. 17, the first image processing module B1 comprises:

- a grayscale module B11, converting the file cover image into the grayscale image;
- an edge detection module B12, connected to the grayscale module B11, and the edge detection module B12 extracts a plurality of edge regions from the grayscale image;
- the plurality of edge regions comprise a word segmentation region composed of a plurality of characters;
- a connected domain analysis module B13, connected to the edge detection module B12, and the connected domain analysis module B13 classifies the area and graphic shape of the edge areas to extract a text area;
- a slice output module B14, connected to the connected domain analysis module B13, and the slice output module B14 generates a character slice image according to the text area, and outputs the character slice image.

Specifically, in order to achieve a faster extraction effect on the text area, in the embodiment, the software structure in the first image processing module B1 is designed as follows: a grayscale module B11 is first used to process the file cover image, remove the color and retain the grayscale information to obtain a grayscale image, and then the edge detection module B12 processes the grayscale image through a Canny operator to extract a plurality of edge regions. It should be noted that in this process, because it is necessary to extract images containing long text information such as words, short sentences, and paragraphs, the Canny operator should configure a large gradient in the processing process to make the Canny operator ignore punctuation, gaps between strokes, words, etc. Then, the connected domain analysis module B13 classifies the area and the graphic shape of the edge area to extract the text area, filters out the paper background area by removing the area that is obviously too large, and screens out the roughly rectangular text area through the graphic shape, so that the slice output module B14 can generate a character slice image that conforms to the subsequent model recognition according to the text area.

As an alternative embodiment, assuming that the captured file cover image must contain some irrelevant environmental background images, after edge detection, it will detect multiple text areas and a file area corresponding to the edge of the document, respectively, and the file area contains pixels much larger than the text area. After the file area is determined, a grid line of a specific size is constructed according to the edge of the file area, and the text area is cropped or expanded on the basis of the grid line to obtain a roughly corresponding text slice image.

Figure 18:
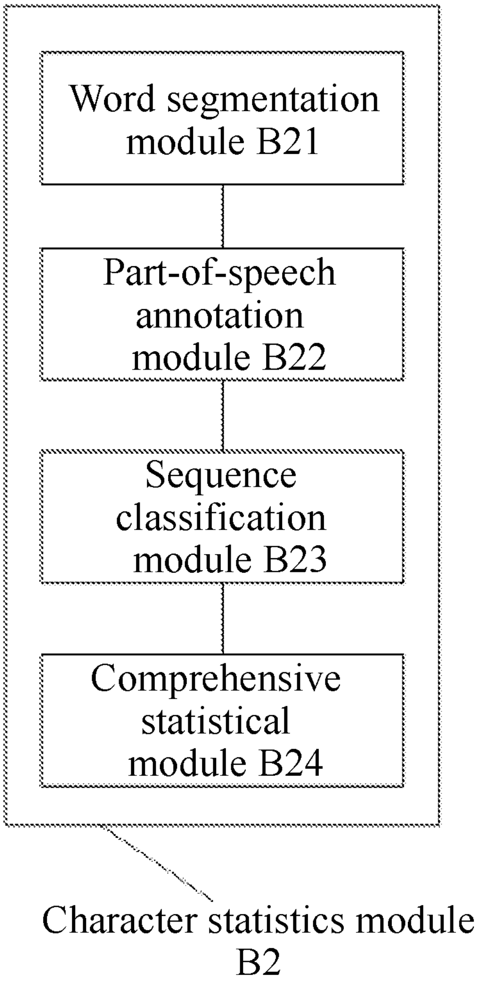
FIG. 18 is a schematic diagram of the character statistics module in the present invention.

In the embodiment, as shown in FIG. 18, the character statistics module B2 comprises:

- a word segmentation module B21, performing word segmentation processing on the character slice image to extract to obtain the word information and assemble to obtain the text sequence;
- a part-of-speech annotation module B22, connected to the word segmentation module B21, and the part-of-speech annotation module B22 performs part-of-speech annotation on a plurality of word information in the text sequence to obtain an annotation sequence;
- a sequence classification module B23, connected to the part-of-speech annotation module B22, and the sequence classification module B23 classifies the annotation sequence to obtain the category to which the annotation sequence belongs;
- a comprehensive statistical module B24, connected to the sequence classification module B23, and the comprehensive statistical module B24 obtains the category to which the documents to be entered into the cabinet belong according to the category to which the annotation sequence belongs.

Specifically, in order to achieve a better semantic statistical effect, in this embodiment, for the character slice image, four groups of software modules, namely the word segmentation module B21, the part-of-speech annotation module B22, the sequence classification module B23 and the comprehensive statistics module B24, are respectively designed in the character statistics module B2, and the corresponding data processing process is designed, specifically, it comprising: firstly, the word segmentation module B21 is used to recognize the character slice image to obtain a string, and then the word information is obtained through dictionary matching and the text sequence is reassembled. On this basis, the part-of-speech annotation module B22 annotates the parts of information of multiple words in the text sequence to obtain the annotation sequence. The sequence classification module B23 adopts a long short-term memory model to realize the classification of semantics by inputting an annotation sequence, so as to determine the event category described by the annotation sequence, which corresponds to the category to which the document belongs, and outputs the classification result as the category to which the annotation sequence belongs. Finally, the comprehensive statistics module B24 obtains the category of the documents to be entered into the cabinet according to the category to which the annotation sequence belongs.

Figure 19:
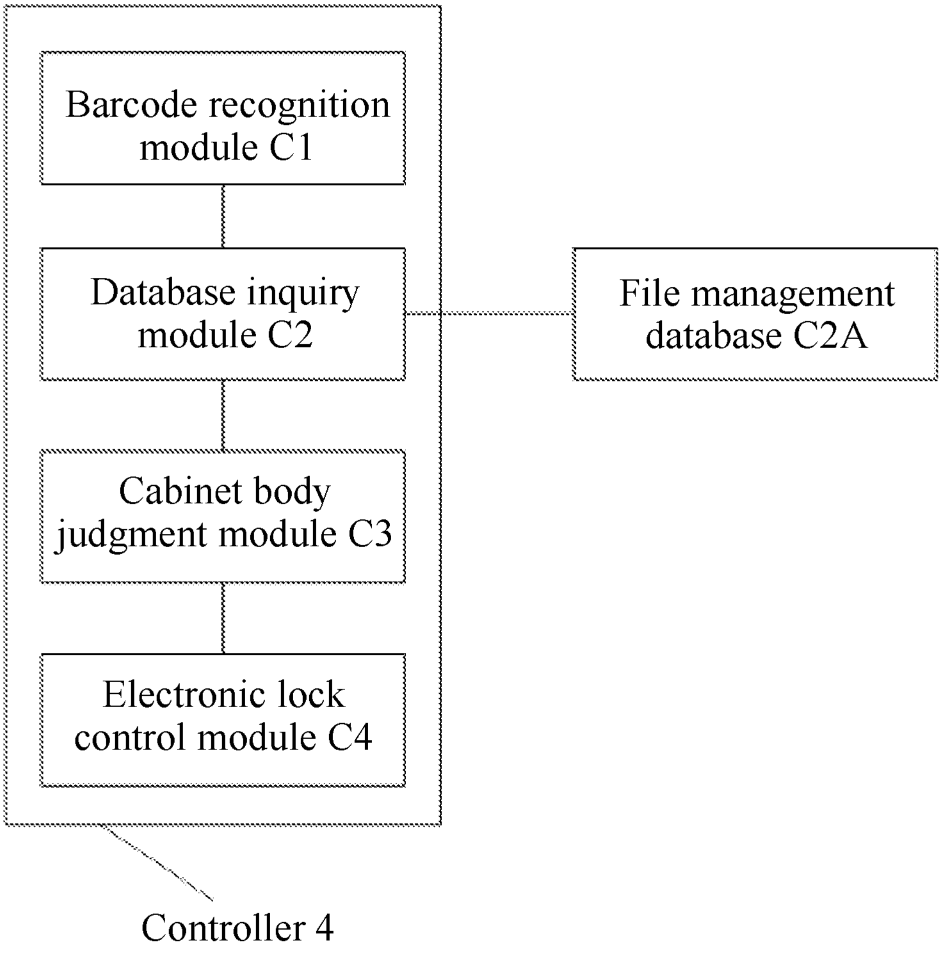
FIG. 19 is a schematic diagram of the file management database in the present invention.

In the embodiment, as shown in FIG. 19, the controller 4 further comprises:

- a barcode recognition module C1, identifying and obtaining a file coding information from the character slice image;
- a database inquiry module C2, connected to an external file management database C2A and the barcode recognition module C1, and the database inquiry module C1 searches the file management database C2 according to the file coding information, to generate a search information;
- the search information comprises historical storage cabinet information of the documents to be entered into the cabinet;
- a cabinet body judgment module C3, connected to the database inquiry module C2, the cabinet body judgment module C3 judges whether the documents to be entered into the cabinet is taken out from the current cabinet body, according to the search information, and generates a cabinet body judgment result;
- an electronic lock control module C4, connected to the cabinet body judgment module C3, and the electronic lock control module C4 controls unlocking and locking of the electronic lock according to the cabinet body judgment result.

Specifically, in order to achieve a better storage effect for archived documents, a file coding system based on computer technology is also introduced in this embodiment. Based on this system, a barcode information is printed at a specific position on the cover for newly inbound legal documents, and the barcode information is added to the image when the image sensor takes a file cover image. Then, the file cover image is also input to the barcode recognition module C1, the barcode part therein can be read and recognized by the barcode recognition module C1 to obtain the corresponding file coding information, and this technical means mainly rely on the existing barcode recognition technology to realize. On this basis, the database inquiry module C2 searches the file management database C2A according to the file coding information to generate the search information, including the file code, the category to which it belongs and the number of the cabinet body that was stored before. The document management database C2A is a pre-built external database used to store the relevant records of legal documents. Subsequently, the cabinet body judgment module C3 is compared according to the number of the cabinet body on which the electronic lock where the search information and the collected file coding information are located, and judges whether the document to be entered into the cabinet is taken out from this cabinet, and the cabinet body judgment result is generated, and the electronic lock control module C4 generates the corresponding message to control electronic lock to open or close according to the cabinet body judgment result, and the problem of document pick-up and place displacement is avoided.

Figure 20:
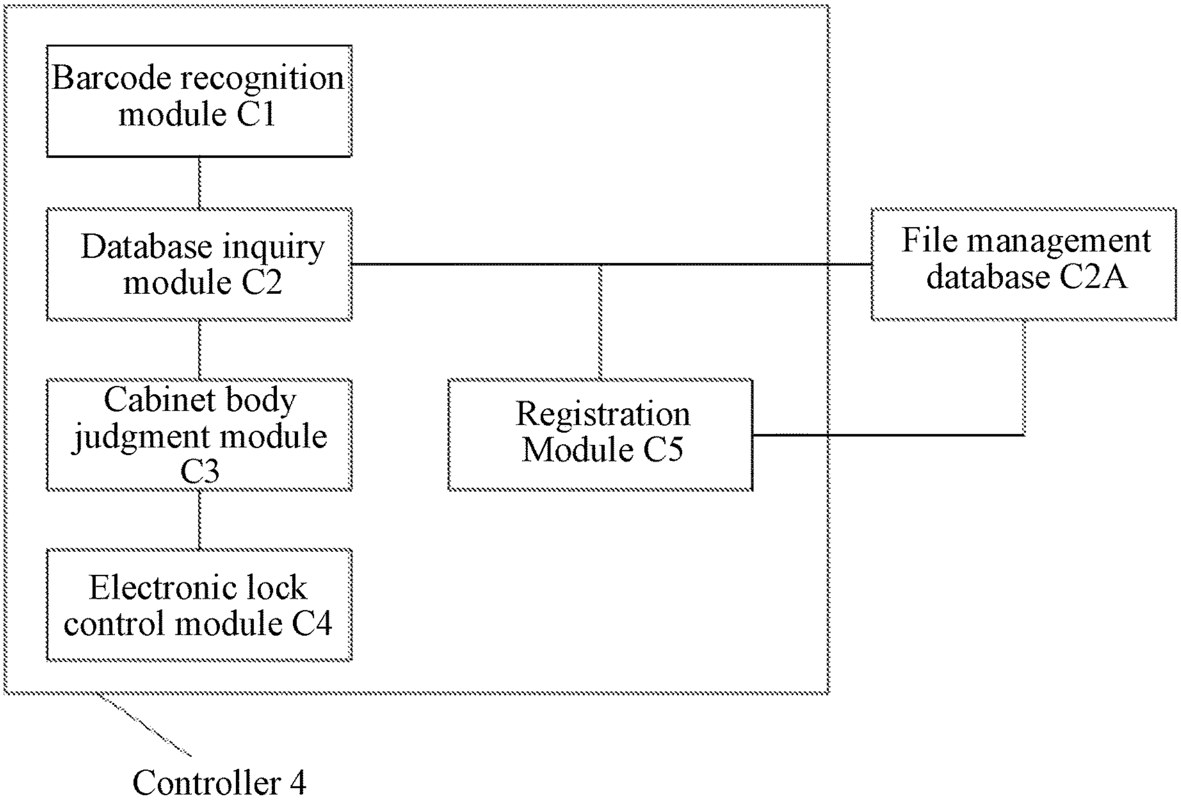
FIG. 20 is a schematic diagram of the registration module in the present invention.

In the embodiment, as shown in FIG. 20, the controller 4 further comprises:

- a registration module C5, connected to the database inquiry module C2 and the file management database C2A, and when the search information indicates that the historical storage cabinet information is not presented in the file management database C2A, the registration module C5 registers the documents to be entered into the cabinet in the file management database C2A according to the file coding information.

Specifically, for the newly stored cabinet file, this type of document can also be processed through the registration module C5 in the embodiment, wherein the database inquiry module C2 can obtain the historical storage cabinet information for the document that has been stored in the cabinet in the process of querying the file management database C2A, and the information cannot be obtained for the newly stored document. At this moment, the registration module C5 registers the document to be entered into the cabinet according to the file coding information in the file management database C2A, and generates the corresponding historical storage cabinet information according to the number of the cabinet body where the electronic lock that collects the file coding information is located, so as to facilitate subsequent archiving.

Figure 21:
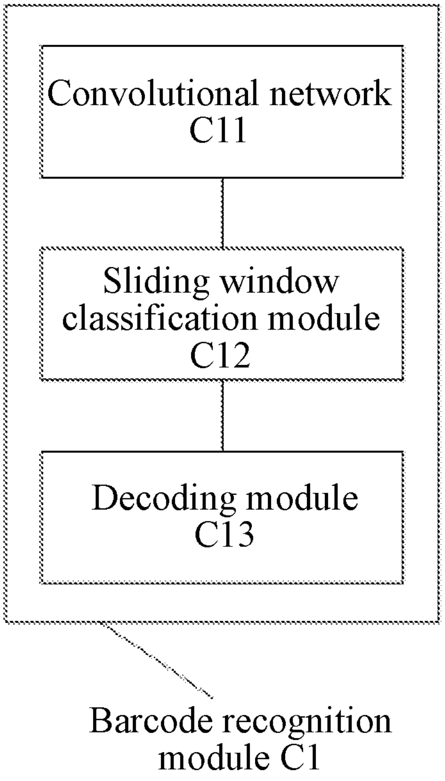
FIG. 21 is a schematic diagram of the barcode recognition module in the present invention.

In the embodiment, as shown in FIG. 21, the barcode recognition module C1 comprises:

- a convolutional network C11, wherein the convolutional network C11 performs a series of convolutions on the character slice image to extract a first feature map;

a sliding window classification module C12, connected to the convolutional network C11, the sliding window classification module C12 adopts a plurality of sliding windows with different sizes to cut the first feature map to obtain a window map, and classifies the window map to obtain a barcode area;

a decoding module C13, connected to the sliding window classification module C12, and the decoding module C13 decodes the barcode area to obtain the file coding information.

Specifically, in view of the problem that the size is not fixed in the shooting process, in the embodiment, a convolutional network C11 is used to perform a series of convolutions on a character slice image to extract the first feature map, after extracting the feature map, the convolutional network C11 is connected through the sliding window classification module C12, the sliding window classification module C12 uses a plurality of sliding windows with different sizes to cut the first feature map to obtain a window map, and the window map is classified, to determine whether the window map contains a complete recognizable barcode, and if so, it is marked as a barcode area output. By setting up a number of sliding windows with different sizes, it can better match to the barcodes with sizes changed at different shooting distances. Finally, on the basis of determining the barcode area, the barcode area is decoded by the decoding module C13 to obtain the file coding information.

Furthermore, as a preferred embodiment, the device further comprises humidity sensors 7, one of the humidity sensors 7 is arranged in each of the storage cavities respectively, the humidity sensors 7 are arranged on the inner wall of the cabinet body 1, and the humidity sensors 7 are connected to the controller 4.

The arranged humidity sensors 7 are used for detecting the humidity in the cabinet body 1, and the air humidity situation in each of the storage cavities is displayed on the controller 4, wherein the controller 4 has a display and a control button, the display is used for displaying the air humidity in the storage cavity, and the control button is used for inputting the number to control the opening of the cabinet door 3.

Figure 22:
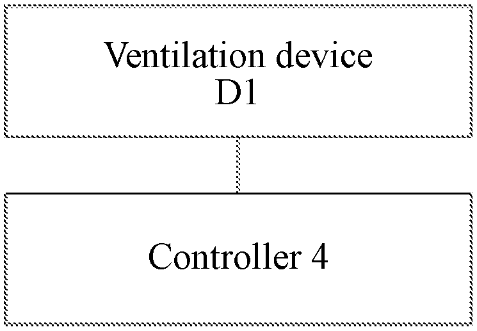
FIG. 22 is a schematic diagram of the ventilation device in the present invention.

In the embodiment, a ventilation device D1 is installed on a back of the cabinet body, and the ventilation device D1 is connected between the inner and the exterior of the cabinet body respectively;

as shown in FIG. 22, the ventilation device D1 is connected to and controlled by the controller 4;

the controller 4 controls the opening of the ventilation device D1 according to humidity data output by the humidity sensors 7 and a pre-configured humidity threshold, so as to ventilate the inner of the cabinet body.

Specifically, in order to achieve a better dehumidification effect, a ventilation device D1 is also arranged on the cabinet body in this embodiment, and the ventilation device D1 is connected between the inside and outside of the cabinet body respectively. In the state that the file cabinet is closed, the controller 4 continuously collects the humidity data that the humidity sensor 7 outputs, and compares with the pre-configured humidity threshold, judges whether the humidity in the current cabinet body is too large, if it is too large, then controls ventilation device D1 to open, to ventilate the inside of the cabinet body, thereby avoid the problem that the humidity in the cabinet body damages the document.

Figure 23:
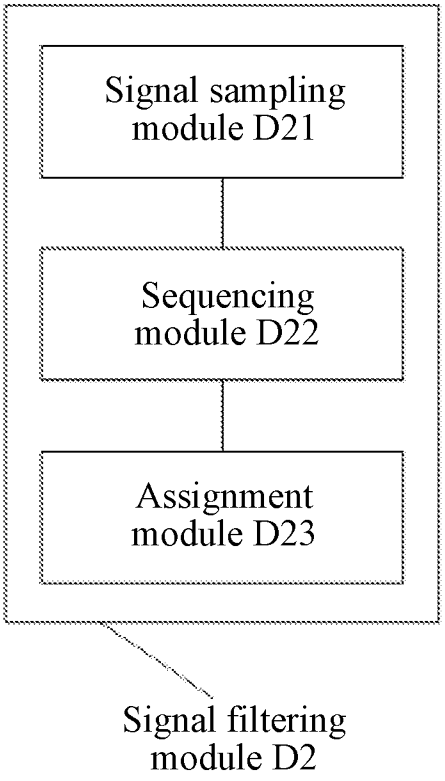
FIG. 23 is a schematic diagram of the signal filtering module in the present invention.

In the embodiment, controller 4 further comprises a signal filtering module D2, and the signal filtering module D2 is used for filtering the humidity data output by the humidity sensors;

as shown in FIG. 23, the signal filtering module D2 comprises:

a signal sampling module D21, intercepting the input humidity data according to a preconfigured receiving window, and sampling the humidity data according to a preset sampling rate, to obtain a window sampling data;

a sequencing module D22, connected to the signal sampling module D21, and the sequencing module D22 compares a plurality of data points in the window sampling data to obtain a median value of the plurality of data points;

an assignment module D23, connected to the sequencing module D22, and the assignment module D23 outputs the median value as an actual humidity data.

Specifically, in order to achieve a better judgment effect, in this embodiment, a signal filtering module D2 is also arranged in the controller 4 to filter the humidity data output by the humidity sensor 7, so that the problem that the ventilation device D1 is mistakenly opened due to electromagnetic interference is avoided. Specifically, for the analog signal output by the humidity sensor 7, the signal sampling module D21 samples the humidity data according to the preset sampling rate, obtains the digital sampling data, and then intercepts according to the preconfigured receiving window, obtains the window sampling data within a certain period of time. Then, for a number of discrete data points, the sequencing module D22 sorts and compares them, so as to obtain the median value of the data points. Then, the median value is used as the output of the humidity data obtained in the current window, which achieves better data smoothness and avoids the problem of sudden interference.

Figure 8:
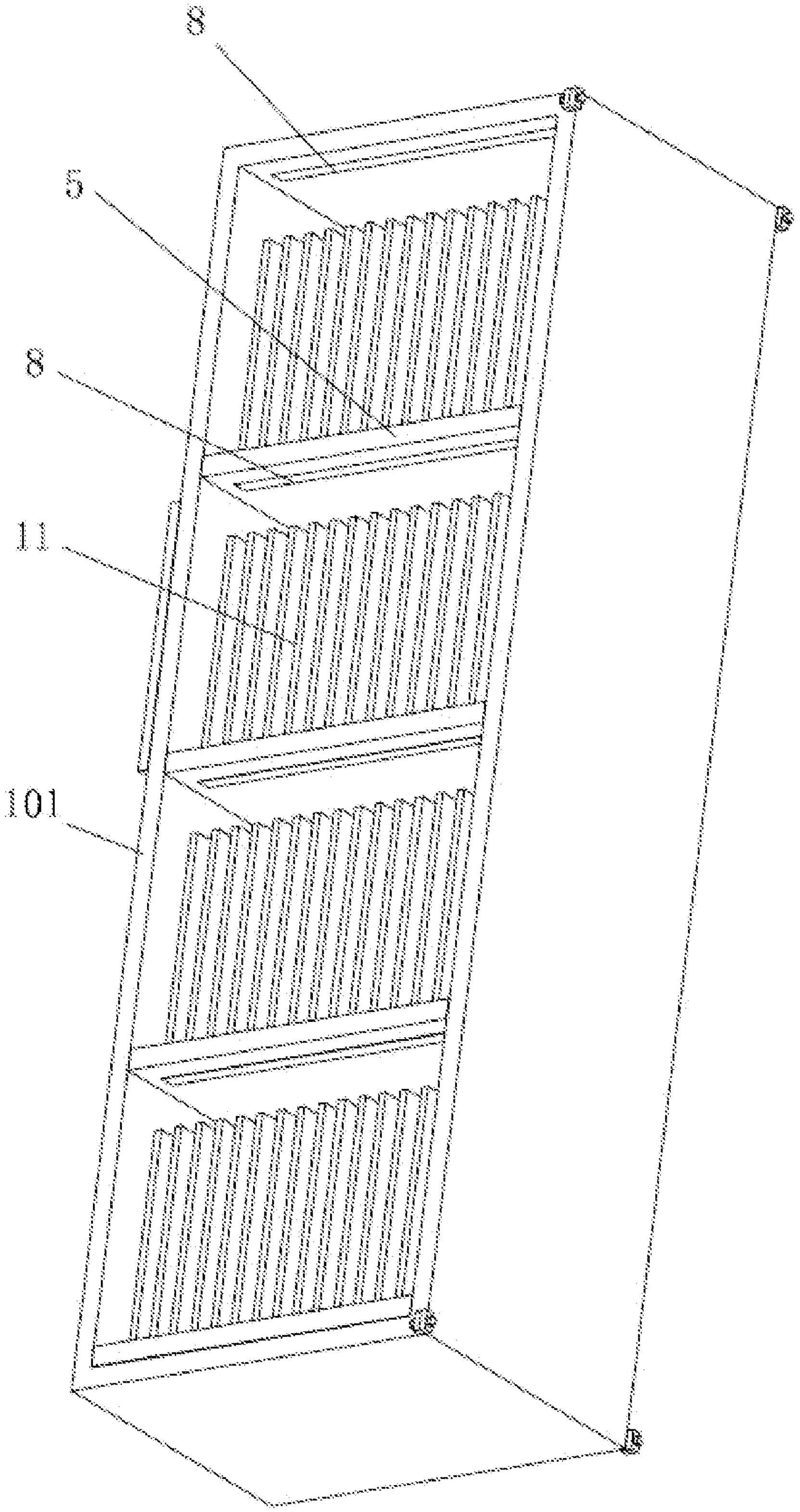
FIG. 8 is a schematic diagram III of the internal structure of the main cabinet body in the present invention.
Figure 9:
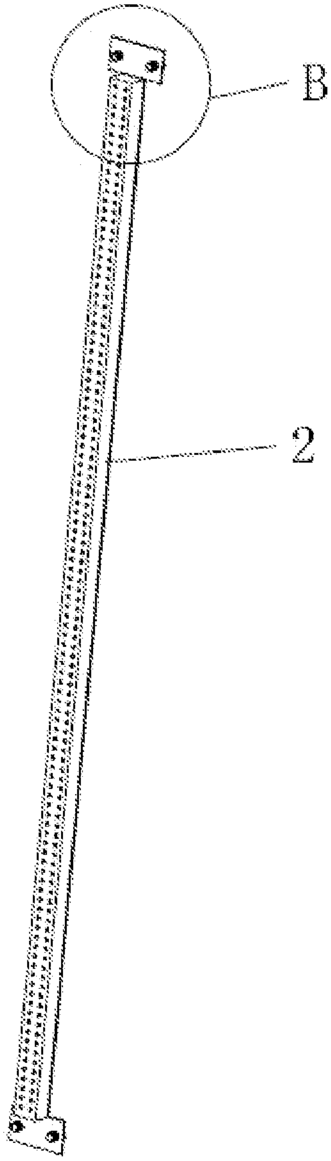
FIG. 9 is a schematic diagram of the structure of the drying and mildew prevention mechanisms in the present invention.
Figure 10:
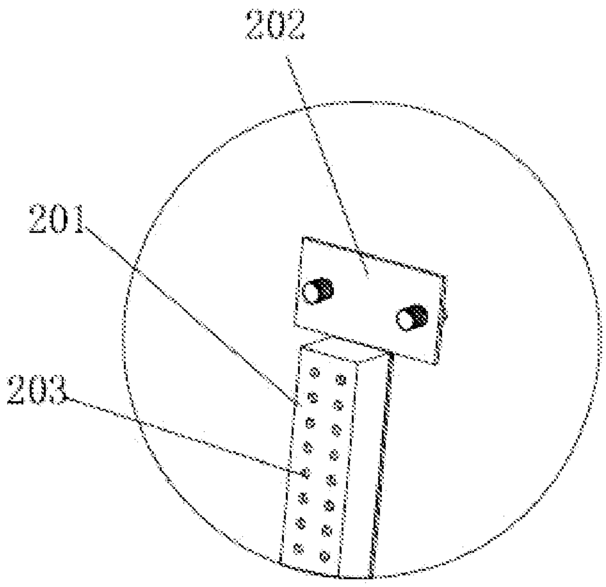
FIG. 10 is an enlarged view of B in FIG. 9.

Furthermore, as a preferred embodiment, the device further comprises lighting lamps 8, an upper side of each of the storage cavities is provided with one of the lighting lamps 8 respectively, as shown in FIG. 8, one of the lighting lamps 8 is also arranged on the inner wall of the upper side of the cabinet body 1. The device also comprises a warning light 9 and a voice prompter 10, each of the cabinet doors 3 is provided with a warning light 9 respectively, an upper end of the cabinet body 1 is provided with a voice prompter 10. Specifically, the voice prompter 10 is arranged on the main cabinet body 101. The lighting lamps 8, the warning light 9, and the voice prompter 10 are connected to the controller 4 respectively. Wherein, the lighting lamp 8 is used for providing illumination in the storage cavity of the document, so that the document and material can be found when the light is dim. And the lighting lamp 8 can be automatically opened under the control of controller 4, and when the cabinet door 3 is opened, the corresponding lighting lamp 8 can automatically light up, and when the cabinet door 3 is closed, the lighting lamp 8 can be turned off. The warning light 9 can be LED light, and warning light 9 has two states, one state is to light up green light, and another state is to flash red light. For example, when the air humidity in the storage cavity is detected to be higher than the specified value, the corresponding warning light 9 will continuously flash the red light at this moment, and if the air humidity in the detected storage cavity is lower than the specified value, the corresponding warning light 9 will display a green light. The voice prompter 10 that is set up is used for prompting the state of cabinet door 3, when cabinet door 3 is opened, voice prompter 10 can prompt cabinet door 3 has been opened, when the cabinet door 3 is closed, the voice prompter 10 can prompt the cabinet door 3 has been closed, so that it is convenient to prompt user, and can avoid forgetting to close the cabinet door 3.

Furthermore, as a preferred embodiment, the device further comprises file clamping mechanisms 11, and an upper end of each of the support plates 5 is provided with one of the file clamping mechanisms 11 respectively. In the embodiment, the arranged file clamping mechanism 11 is used for clamping the file folder, so that the file folder can be placed vertically and orderly, and the file folder is avoided from being inclined and messy.

Figure 11:
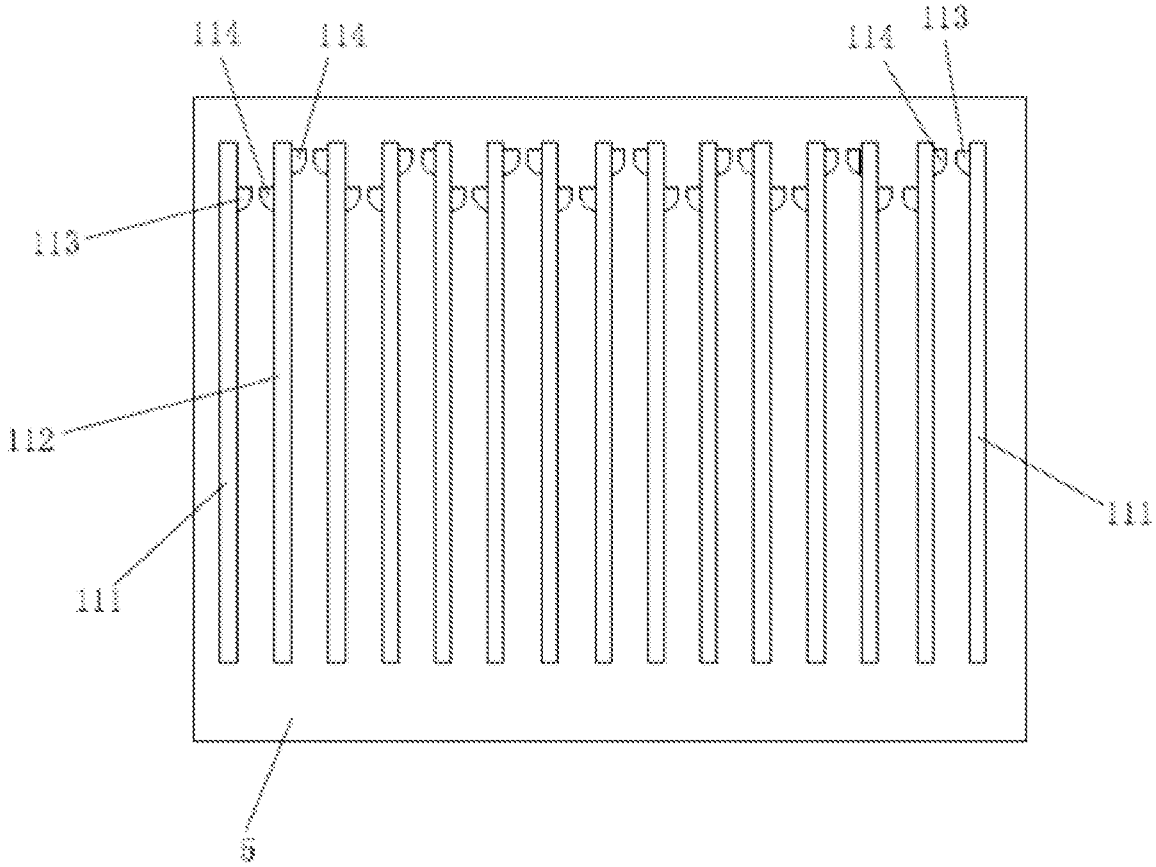
FIG. 11 is a top view of the file clamping mechanisms in the present invention.
Figure 12:
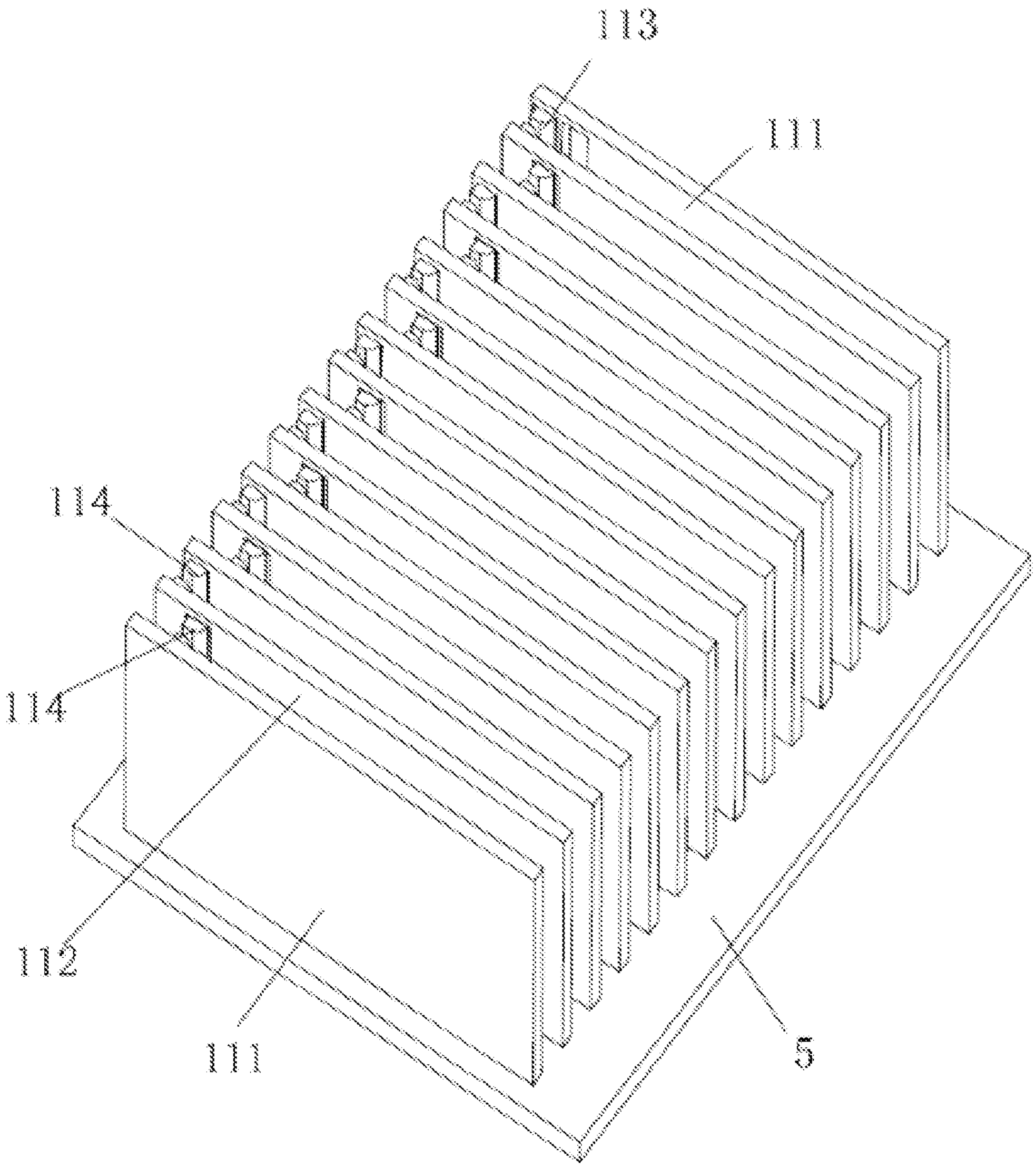
FIG. 12 is a perspective view of the file clamping mechanisms in the present invention.
Figure 13:
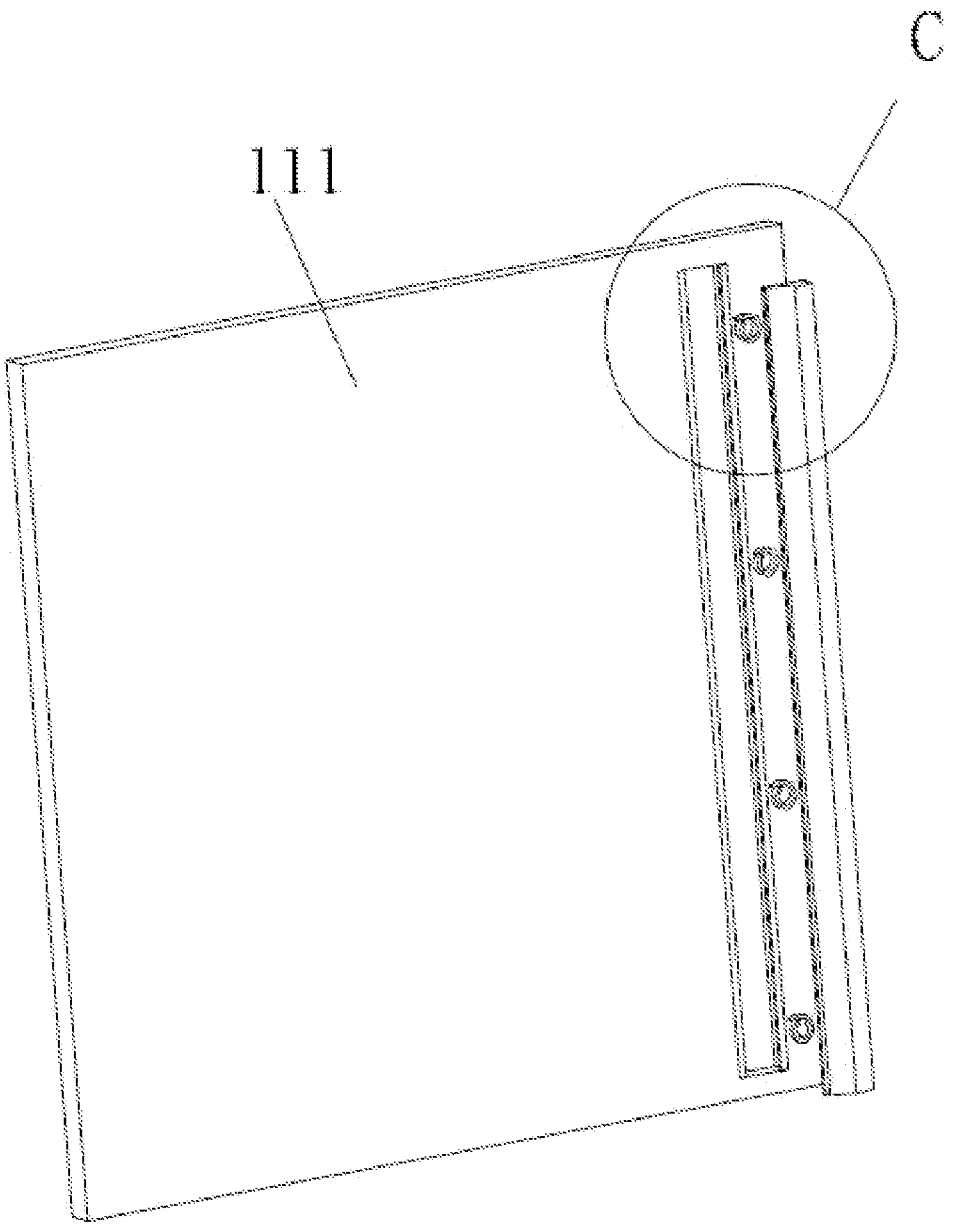
FIG. 13 is an explosive view of the first clamp plate, the first clamping block matching with the springs in the present invention.
Figure 14:
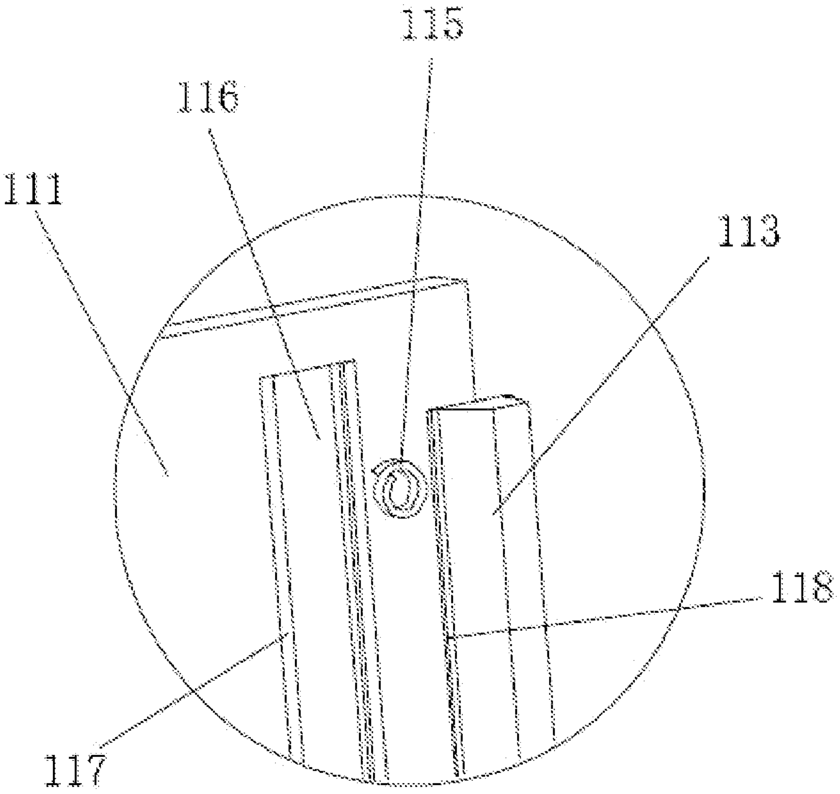
FIG. 14 is an enlarged view of C in FIG. 13.

Furthermore, as a preferred embodiment, each of the file clamping mechanisms 11 comprises a first clamp plate 111, a second clamp plate 112, a first clamping block 113 and a second clamping block 114;

the first clamp plates 111 and the second clamp plates 112 are all arranged on the support plates 5, a plurality of the second clamp plates 112 are arranged between the two of the first clamp plates 111, one side of each of the first clamp plates 111, which is close to one of the second clamp plates 112, is provided with one of the first clamping blocks 113, two sides of each of the second clamp plates 112 are provided with one of the second clamping blocks 114, the two second clamping blocks 114 on each of the second clamp plates 112 are staggered with each other, and the two second clamping blocks 114, on one side of the two adjacent second clamp plates 112 which are closed to each other, are opposite to each other. Referring to FIG. 11 and FIG. 12, the length of the first clamp plate 111 and the length of the second clamp plate 112 are less than the width of the supporting plate 5, each of the two first clamp plate 111 is provided with a first clamping block 113, and each of the second clamp plates 112 is provided with two second clamping blocks 114 respectively, the first clamping block 113 is arranged opposite to the corresponding second clamping block 114, as can be shown in FIG. 11. By the matching of the first clamping block 113 and the second clamping block 114, and the matching of two second clamping blocks 114 that are opposite to each other, the clamping and fixing of the file folder can be realized, and by the arrangement of the first clamp plate 111 and the second clamp plate 112, the file folder can be kept in a vertical state. The first clamp plate 111 and the second clamp plate 112 can squeeze the panels of both sides of the file folder, so that the panels of both sides of the file folder can be kept vertical and flat. The first clamping block 113 and the second clamping block 114 can clamp the panels of both sides of the file folder, so that the opening of one end of the file folder is closed, the document in the file folder is clamped, and the position of the file folder can be fixed, and the file folder can be kept upright.

The file folder in the embodiment comprises a side plate and a panel connected to two sides of the side plate, and the two panels may be close to or far away from each other. Under normal circumstances, the panel of the file folder is elastic, while the side panels of the file folder have a certain hardness. When in use, one end of the file folder is inserted between two second clamping blocks 114 or between the first clamping block 113 and the second clamping block 114, and then the file folder is pushed so that one end of the file folder is against the inner wall of the other end of the cabinet body 1, and the side plate of the file folder is positioned at the outside of two second clamp plates 112 or the outside of the first clamp plate 111 and the second clamp plate 112, so that the file folder can be easily taken. Further, the spacing between the first clamp plate 111 and the second clamp plate 112 and the spacing between the two adjacent second clamp plate 112 are smaller than the width of the side plates of the file folder, so that the side plates of the file folder are avoided from entering between the first clamp plate 111 and the second clamp plate 112 or between the two adjacent second clamp plates 112.

Furthermore, as a preferred embodiment, the device further comprises a plurality of springs 115, mounting grooves 116 are formed in the first clamp plates 111 and the second clamp plates 112, the plurality of springs 115 are arranged in the mounting grooves 116, the first clamping blocks 113 and the second clamping blocks 114 are arranged in the corresponding mounting grooves 116, and the first clamping blocks 113 and the second clamping blocks 114 are connected to the corresponding springs 115 respectively. The springs 115 are arranged in the mounting grooves 116 and are connected to the inner wall of the mounting groove 116. The first clamping block 113 and the second clamping block 114 are arranged in the corresponding mounting groove 116. One end of the first clamping block 113 and one end of the second clamping block 114 are connected to the spring 115, and the other end of the first clamping block 113 and the other end of the second clamping block 114 extend out of the mounting groove 116 for clamping the file folder. When the file folder enters between two second clamping blocks 114 or between the first clamping block 113 and the second clamping block 114, the first clamping block 113 is pushed, the second clamping block 114 compresses the spring 115, which causes the first clamping block 113 and the second clamping block 114 to enter the mounting groove 116.

Figure 24:
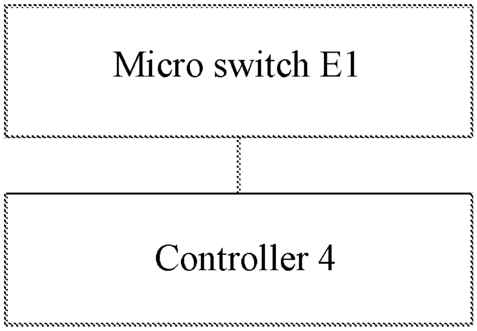
FIG. 24 is a schematic diagram of the micro switches in the present invention.

In the embodiment, micro switches E1 are further arranged in the mounting grooves 116, and a triggering part of the micro switches E1 resists against the internal bottom surface of the first clamping blocks 113 or the second clamping blocks 114;

as seen from FIG. 24, the micro switches E1 are connected to the controller 4, and output a micro switch trigger signal to the controller 4 when the trigger part is pressed;

the micro switch trigger signal comprises a number corresponding to one of the micro switches;

the controller 4 determines document placement position according to the micro switch trigger signal.

Specifically, in order to achieve a better process of collecting file information, in this embodiment, micro switches E1 are also arranged in the mounting grooves 116, the main body of the micro switch E1 is fixed in the mounting groove 116, and the triggering part resists against the internal bottom surface of the first clamping block 113 or the internal bottom surface of the second clamping block 114. When the file folder enters between two second clamping blocks 114 or between the first clamping block 113 and the second clamping block 114, the first clamping block 113 and the second clamping block 114 are pushed to press down the trigger part, so that the micro switch E1 generates an electrical signal, and through the switch signal sending module E2 associated with the micro switch E1, a micro switch trigger signal is generated and sent to the controller 4, and the controller 4 reads the number information contained in the signal and easily determines the actual position of the document that is put in at present.

Furthermore, as a preferred embodiment, the device further comprises a first limiting plate 117 and a second limiting plate 118, two sides of a notch of each of the mounting grooves 116 is provided with one of the first limiting plates 117, two sides of the first clamping blocks 113 and the second clamping blocks 114 are provided with one of the second limiting plates 118, the first limiting plates 117 are matched with the second limiting plates 118, so as to limit the first clamping blocks 113 and the second clamping blocks 114 in the mounting grooves 116. The first limiting plate 117 is arranged at two sides of the notch of the mounting groove 116, the second limiting plate 118 is arranged on the first clamping block 113 and the second clamping block 114, and when the spring 115 pushes the first clamping block 113 or the second clamping block 114 to move outward, the first limiting plate 117 can resist the second limiting plate 118, so that the first clamping block 113 and the second clamping block 114 are prevented from being separated from the mounting groove 116.

When in use, the file folder that is equipped with the same type of legal document can be placed in the specified storage cavity according to the word label on the cabinet door 3, when the cabinet door 3 is opened, the specified number can be input according to the controller 4, and the specified cabinet door 3 is opened, then the file folder is placed in the file clamping mechanism 11. When the file folder is placed, the opening of the file folder is extended into the gap between two second clamping blocks 114 or between the first clamping block 113 and the second clamping block 114, and then the file folder is pushed, so that the panels of both sides of the file folder push the first clamping block 113 and/or the second clamping block 114 to enter into the mounting groove 116, and then continues to push the file folder, so that the opening of the file folder resists against the inner wall of the cabinet body 1, the cabinet door 3 can be closed. The drying and mildew prevention mechanism 2 can be pre-installed on the cabinet body 1. Humidity sensor 7 can detect the humidity in the storage cavity, and then it is shown on the display of controller 4, and the controller 4 judges whether the humidity in the storage cavity meets the requirement by the state of warning light 9. When need to take out the document, the controller 4 controls the designated cabinet door 3 to open, and when the cabinet door 3 is opened, the corresponding lighting lamp 8 will automatically light up, the voice prompter 10 prompts the state of the cabinet door 3 simultaneously, and the legal document is taken out and the cabinet door 3 is closed.

The above is only a better embodiment of the present invention, and does not limit the embodiment and scope of protection of the present invention, and those skilled in the art should realize that all schemes obtained by using the equivalent substitution and obvious changes made by the description and drawings of the present invention should be included in the scope of protection of the present invention.

What is claimed is:

1. A device for storing legal documents and materials, comprising a cabinet body, a plurality of cabinet doors, a controller and a plurality of support plates, an inner of the cabinet body is provided with the plurality of support plates, a storage cavity is formed between two adjacent support plates, one end of the cabinet body is provided with the plurality of cabinet doors, each of the plurality of cabinet doors is opposite to one of the storage cavities respectively, one side of the cabinet body is provided with the controller;

one end of the cabinet door is hinged with the cabinet body, the other end of the cabinet door is connected to the cabinet body through an electronic lock, and the electronic lock is connected to the controller, an image sensor is arranged along the orthogonal direction on the electronic lock, the image sensor is connected to the controller, the image sensor is used for collecting a file cover image of the documents to be entered into the cabinet, and the controller controls unlocking or locking of the electronic lock according to the file cover image;

wherein the controller comprises;

a first image processing module, receiving the file cover image and extracting the file cover image to obtain a character recognition result;

the character recognition result comprises a plurality of character slice images corresponding to the front character of the documents to be entered into the cabinet;

a character statistics module, connected to the first image processing module, the character statistics module classifies and does statistics to the character slice images sequentially, and judges a category to which the documents to be entered into the cabinet belong according to a statistical result:

an unlocking module, connected to the character statistics module, the unlocking module judges the documents to be entered into the cabinet according to the category and a predetermined cabinet classification, and controls the electronic lock, so that the documents to be entered into the cabinet conform to the cabinet classification.

2. The device for storing legal documents and materials of claim 1, wherein the first image processing module comprises:

a grayscale module, converting the file cover image into the grayscale image;

an edge detection module, connected to the grayscale module, and the edge detection module extracts a plurality of edge regions from the grayscale image;

the plurality of edge regions comprise a word segmentation region composed of a plurality of characters;

a connected domain analysis module, connected to the edge detection module, and the connected domain analysis module classifies the area and graphic shape of the edge areas to extract a text area;

a slice output module, connected to the connected domain analysis module, and the slice output module generates a character slice image according to the text area, and outputs the character slice image.

3. The device for storing legal documents and materials of claim 1, wherein the character statistics module comprises:

a word segmentation module, performing word segmentation processing on the character slice image to extract to obtain the word information and assemble to obtain the text sequence;

a part-of-speech annotation module, connected to the word segmentation module, and the part-of-speech annotation module performs part-of-speech annotation on a plurality of word information in the text sequence to obtain an annotation sequence;

a sequence classification module, connected to the part-of-speech annotation module, and the sequence classification module classifies the annotation sequence to obtain the category to which the annotation sequence belongs;

a comprehensive statistical module, connected to the sequence classification module, and the comprehensive statistical module obtains the category to which the documents to be entered into the cabinet belong according to the category to which the annotation sequence belongs.

4. The device for storing legal documents and materials of claim 1, the controller further comprises:

a barcode recognition module, identifying and obtaining a file coding information from the character slice image;

a database inquiry module, connected to an external file management database and the barcode recognition module, and the database inquiry module searches the file management database according to the file coding information, to generate a search information;

the search information comprises historical storage cabinet information of the documents to be entered into the cabinet;

a cabinet body judgment module, connected to the database inquiry module, the cabinet body judgment module judges whether the documents to be entered into the cabinet is taken out from the current cabinet body, according to the search information, and generates a cabinet body judgment result;

an electronic lock control module, connected to the cabinet body judgment module, and the electronic lock control module controls unlocking and locking of the electronic lock according to the cabinet body judgment result.

5. The device for storing legal documents and materials of claim 4, wherein the controller further comprises:

a registration module, connected to the database inquiry module and the file management database, and when the search information indicates that the historical storage cabinet information is not presented in the file management database, the registration module registers the documents to be entered into the cabinet in the file management database according to the file coding information.

6. The device for storing legal documents and materials of claim 1, wherein the other end of the cabinet body is detachably provided with the plurality of drying and mildew prevention mechanisms, a gap is formed between the support plate and an inner wall of the other end of the cabinet body;

each of the plurality of drying and mildew prevention mechanisms comprises:

an accommodation box, the other end of the cabinet body is provided with a mounting hole, the accommodation box is arranged in the mounting hole, the accommodation box, which is positioned at one side of the cabinet body, is provided with a plurality of through holes, a plurality of drying pills is filled in the accommodation box;

two connecting plates, provided at two ends of accommodation box, the connecting plates are detachably connected to the cabinet body.

7. The device for storing legal documents and materials of claim 1, further comprises humidity sensors, one of the humidity sensors is arranged in each of the storage cavities respectively, the humidity sensors are arranged on the inner wall of the cabinet body, and the humidity sensors are connected to the controller.

8. The device for storing legal documents and materials of claim 7, wherein a ventilation device is installed on a back of the cabinet body, and the ventilation device is connected between the inner and the exterior of the cabinet body respectively;

the ventilation device is connected to and controlled by the controller;

the controller controls the opening of the ventilation device according to humidity data output by the humidity sensors and a pre-configured humidity threshold, so as to ventilate the inner of the cabinet body.

9. The device for storing legal documents and materials of claim 8, wherein the controller further comprises a signal filtering module, and the signal filtering module is used for filtering the humidity data output by the humidity sensors;

the signal filtering module comprises:

a signal sampling module, intercepting the input humidity data according to a preconfigured receiving window, and sampling the humidity data according to a preset sampling rate, to obtain a window sampling data;

a sequencing module, connected to the signal sampling module, and the sequencing module compares a plurality of data points in the window sampling data to obtain a median value of the plurality of data points;

an assignment module, connected to the sequencing module, and the assignment module outputs the median value as an actual humidity data.

10. The device for storing legal documents and materials of claim 1, further comprising lighting lamps, an upper side of each of the storage cavities is provided with one of the lighting lamps respectively, and the lighting lamps are connected to the controller.

11. The device for storing legal documents and materials of claim 1, further comprising a warning light and a voice prompter, each of the cabinet doors is provided with a warning light respectively, an upper end of the cabinet body is provided with a voice prompter, and the warning light and the voice prompter are connected to the controller respectively.

12. The device for storing legal documents and materials of claim 1, wherein the cabinet body comprises a main cabinet body and at least one auxiliary cabinet body that is detachably arranged on the other side of the main cabinet body.

13. The device for storing legal documents and materials of claim 1, further comprising file clamping mechanisms, and an upper end of each of the support plates is provided with one of the file clamping mechanisms respectively.

14. The device for storing legal documents and materials of claim 13, wherein each of the file clamping mechanisms comprises a first clamp plate, a second clamp plate, a first clamping block and a second clamping block;

the first clamp plates and the second clamp plates are all arranged on the support plates, a plurality of the second clamp plates are arranged between the two of the first clamp plates, one side of each of the first clamp plates, which is close to one of the second clamp plates, is provided with one of the first clamping blocks, two sides of each of the second clamp plates are provided with one of the second clamping blocks, the two second clamping blocks on each of the second clamp plates are staggered with each other, and the two second clamping blocks, on one side of the two adjacent second clamp plates which are closed to each other, are opposite to each other.

15. The device for storing legal documents and materials of claim 14, further comprising a plurality of springs, mounting grooves are formed in the first clamp plates and the second clamp plates, the plurality of springs are arranged in the mounting grooves, the first clamping blocks and the second clamping blocks are arranged in the corresponding mounting grooves, and the first clamping blocks and the second clamping blocks are connected to the corresponding springs respectively.

16. The device for storing legal documents and materials of claim 15, further comprising a first limiting plate and a second limiting plate, two sides of a notch of each of the mounting grooves is provided with one of the first limiting plates, two sides of the first clamping blocks and the second clamping blocks are provided with one of the second limiting plates, the first limiting plates are matched with the second limiting plates, so as to limit the first clamping blocks and the second clamping blocks in the mounting grooves.

17. The device for storing legal documents and materials of claim 15, wherein micro switches are further arranged in the mounting grooves, and a triggering part of the micro switches resists against the internal bottom surface of the first clamping blocks or the second clamping blocks;

the micro switches are connected to the controller, and output a micro switch trigger signal to the controller when the trigger part is pressed;

the micro switch trigger signal comprises a number corresponding to one of the micro switches;

the controller determines document placement position according to the micro switch trigger signal.

* * * * *